United States Patent
Drumm

(10) Patent No.: US 9,063,615 B2
(45) Date of Patent: Jun. 23, 2015

(54) DETECTING MULTITOUCH EVENTS IN AN OPTICAL TOUCH-SENSITIVE DEVICE USING LINE IMAGES

(75) Inventor: Owen Drumm, Dublin (IE)

(73) Assignee: Rapt IP Limited, Gibraltar (GI)

( * ) Notice: Subject to any disclaimer, the term of this patent is extended or adjusted under 35 U.S.C. 154(b) by 545 days.

(21) Appl. No.: 13/460,704

(22) Filed: Apr. 30, 2012

(65) Prior Publication Data

US 2012/0212457 A1  Aug. 23, 2012

Related U.S. Application Data

(63) Continuation-in-part of application No. 13/059,817, filed as application No. PCT/EP2009/005736 on Aug. 7, 2009, now Pat. No. 8,350,831, application No. 13/460,704, which is a continuation-in-part of application No. 13/059,772, filed as application No. PCT/EP2009/005739 on Aug. 7, 2009, now Pat. No. 8,227,742.

(30) Foreign Application Priority Data

Aug. 7, 2008 (IE) .................................. S20080651
Aug. 7, 2008 (IE) .................................. S20080652
Oct. 10, 2008 (IE) .................................. S20080827

(51) Int. Cl.
*G06F 3/042* (2006.01)
*G06F 3/041* (2006.01)

(52) U.S. Cl.
CPC ............ *G06F 3/0421* (2013.01); *G06F 3/0416* (2013.01); *G06F 2203/04104* (2013.01)

(58) Field of Classification Search
CPC .......... G06F 3/042–3/0428; G06F 2203/04106
USPC ...................... 345/156–184; 178/18.01–20.04
See application file for complete search history.

(56) References Cited

U.S. PATENT DOCUMENTS

| | | | | |
|---|---|---|---|---|
| 4,301,447 A | * | 11/1981 | Funk et al. ......................... 341/5 |
| 4,746,770 A | * | 5/1988 | McAvinney ............... 178/18.09 |
| 4,782,328 A | * | 11/1988 | Denlinger ......................... 341/5 |
| 6,351,260 B1 | * | 2/2002 | Graham et al. ................ 345/179 |
| 6,429,857 B1 | * | 8/2002 | Masters et al. ................ 345/175 |
| 7,184,030 B2 | * | 2/2007 | McCharles et al. ........... 345/173 |
| 7,435,940 B2 | | 10/2008 | Eliasson et al. |
| 7,442,914 B2 | | 10/2008 | Eliasson et al. |
| 7,465,914 B2 | | 12/2008 | Eliasson et al. |
| 7,538,759 B2 | * | 5/2009 | Newton ......................... 345/173 |
| 7,599,520 B2 | * | 10/2009 | Dempski et al. .............. 382/103 |
| 7,692,625 B2 | * | 4/2010 | Morrison et al. ............. 345/156 |
| 7,948,479 B2 | * | 5/2011 | Liu et al. ....................... 345/173 |
| 8,167,698 B2 | * | 5/2012 | Van De Wijdeven et al. .. 463/14 |
| 8,218,154 B2 | | 7/2012 | Østergaard et al. |
| 8,436,832 B2 | * | 5/2013 | Sohn et al. .................... 345/175 |

(Continued)

FOREIGN PATENT DOCUMENTS

WO    WO 01/40922 A2    6/2001
WO    WO 2008/004103 A2   1/2008

*Primary Examiner* — Patrick F Marinelli
(74) *Attorney, Agent, or Firm* — Fenwick & West LLP

(57) ABSTRACT

An optical touch-sensitive device is able to determine the locations of multiple simultaneous touch events. The optical touch-sensitive device includes multiple emitters and detectors. Each emitter produces optical beams which are received by the detectors. Touch events disturb the optical beams. Line images of the touch events are captured, which are then used to determine the touch events.

31 Claims, 14 Drawing Sheets

(56) References Cited

U.S. PATENT DOCUMENTS

| | | |
|---|---|---|
| 8,937,612 B2* | 1/2015 | Zhu et al. ............... 345/175 |
| 2002/0067348 A1* | 6/2002 | Masters et al. .......... 345/175 |
| 2002/0075243 A1 | 6/2002 | Newton |
| 2005/0162398 A1 | 7/2005 | Eliasson et al. |
| 2006/0202974 A1* | 9/2006 | Thielman ............... 345/175 |
| 2006/0255248 A1 | 11/2006 | Eliasson |
| 2007/0125937 A1 | 6/2007 | Eliasson et al. |
| 2007/0152985 A1 | 7/2007 | Østergaard et al. |
| 2007/0201042 A1 | 8/2007 | Eliasson et al. |
| 2008/0007540 A1 | 1/2008 | Østergaard |
| 2008/0007542 A1 | 1/2008 | Eliasson et al. |
| 2008/0088603 A1 | 4/2008 | Eliasson et al. |
| 2008/0189046 A1 | 8/2008 | Eliasson et al. |
| 2008/0192015 A1* | 8/2008 | Lieberman ............... 345/173 |
| 2008/0259053 A1* | 10/2008 | Newton ............... 345/175 |
| 2009/0058832 A1* | 3/2009 | Newton ............... 345/175 |
| 2009/0122020 A1 | 5/2009 | Eliasson et al. |
| 2009/0251425 A1* | 10/2009 | Sohn et al. ............ 345/173 |
| 2009/0256811 A1* | 10/2009 | Pasquariello ............ 345/173 |
| 2009/0273794 A1 | 11/2009 | Østergaard et al. |
| 2010/0182280 A1* | 7/2010 | Juni ............... 345/175 |
| 2010/0193259 A1 | 8/2010 | Wassvik |
| 2010/0201639 A1* | 8/2010 | Huang et al. ............ 345/173 |
| 2010/0214268 A1* | 8/2010 | Huang et al. ............ 345/175 |
| 2010/0245292 A1* | 9/2010 | Wu ............... 345/175 |
| 2010/0289755 A1* | 11/2010 | Zhu et al. ............ 345/173 |
| 2010/0321340 A1* | 12/2010 | Hsiao et al. ............ 345/175 |
| 2011/0074734 A1 | 3/2011 | Wassvik et al. |
| 2011/0074735 A1 | 3/2011 | Wassvik et al. |
| 2011/0084939 A1* | 4/2011 | Gepner et al. ............ 345/175 |
| 2011/0090176 A1 | 4/2011 | Christiansson et al. |
| 2011/0102374 A1 | 5/2011 | Wassvik et al. |
| 2011/0109565 A1* | 5/2011 | Zhu et al. ............ 345/173 |
| 2011/0157097 A1* | 6/2011 | Hamada et al. ............ 345/175 |
| 2011/0216042 A1 | 9/2011 | Wassvik et al. |
| 2011/0227874 A1 | 9/2011 | Fåhraeus et al. |
| 2011/0241984 A1* | 10/2011 | Morrison et al. ......... 345/157 |
| 2011/0242056 A1* | 10/2011 | Lee et al. ............ 345/175 |
| 2012/0068973 A1 | 3/2012 | Christiansson et al. |
| 2012/0153134 A1 | 6/2012 | Bergström et al. |
| 2012/0154338 A1 | 6/2012 | Bergström et al. |
| 2012/0162142 A1 | 6/2012 | Christiansson et al. |
| 2012/0162144 A1 | 6/2012 | Fåhraeus et al. |
| 2012/0169672 A1 | 7/2012 | Christiansson |
| 2012/0200538 A1 | 8/2012 | Christiansson et al. |
| 2012/0212441 A1 | 8/2012 | Christiansson et al. |
| 2012/0218230 A1* | 8/2012 | Zhao et al. ............ 345/175 |
| 2012/0223916 A1* | 9/2012 | Kukulj ............... 345/175 |
| 2012/0256882 A1 | 10/2012 | Christiansson et al. |
| 2012/0268403 A1 | 10/2012 | Christiansson |
| 2013/0021300 A1 | 1/2013 | Wassvik |
| 2013/0044073 A1 | 2/2013 | Christiansson et al. |
| 2013/0162877 A1* | 6/2013 | Wang et al. ............ 348/333.01 |

* cited by examiner

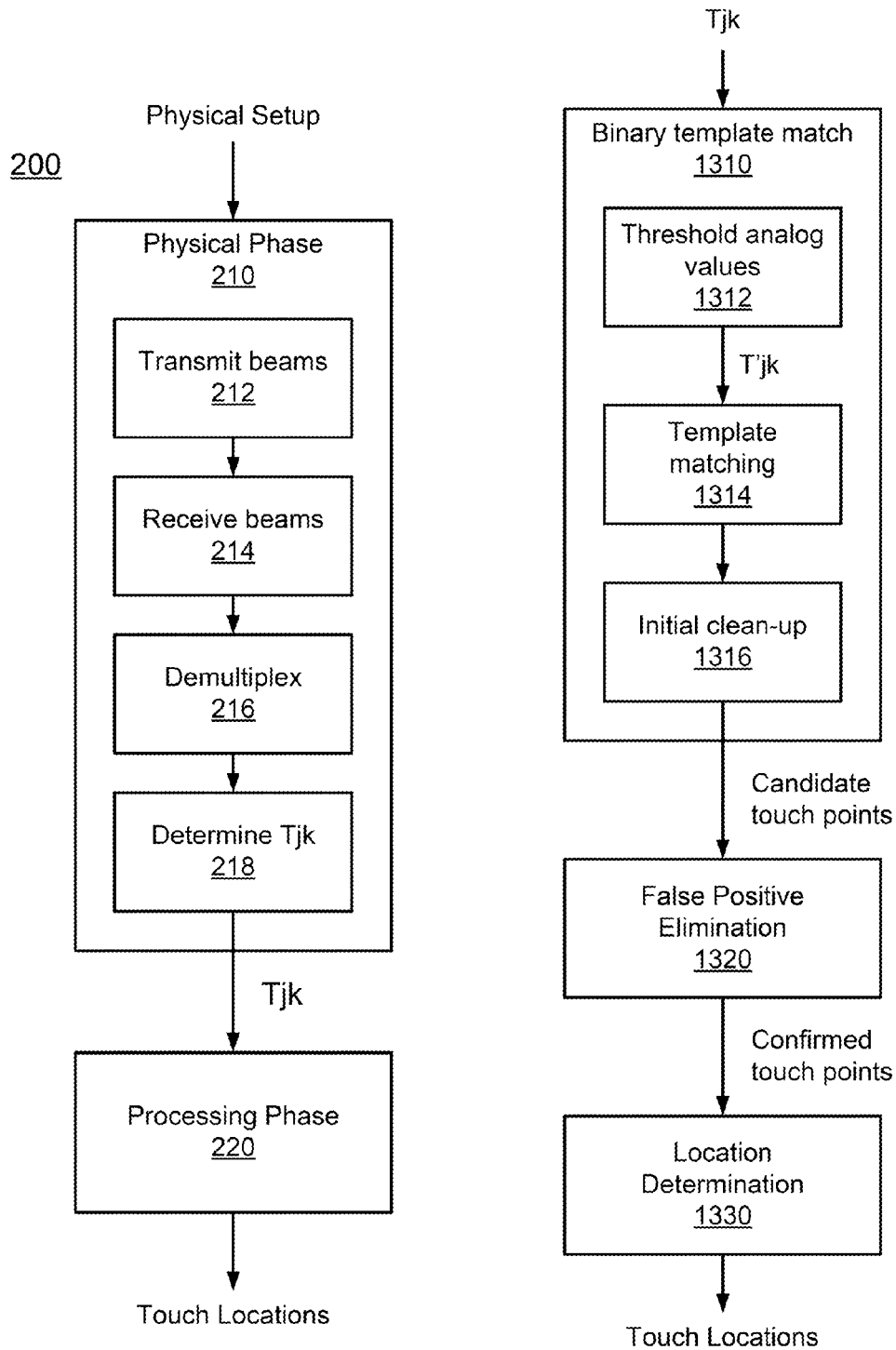

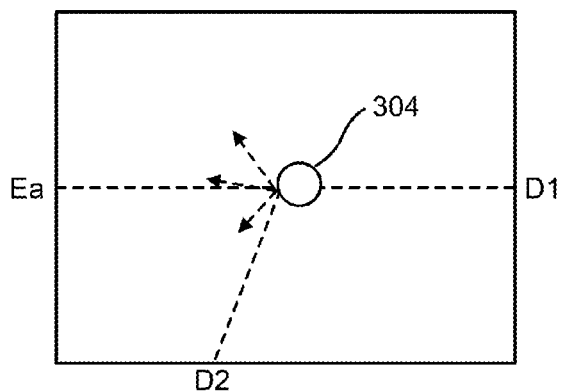
FIG. 3F
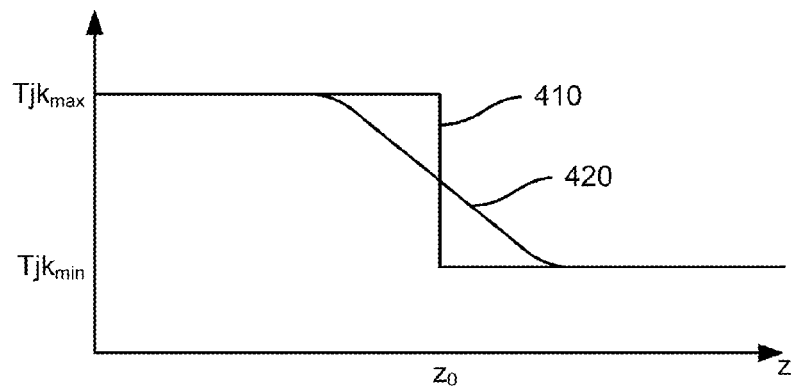
FIG. 4
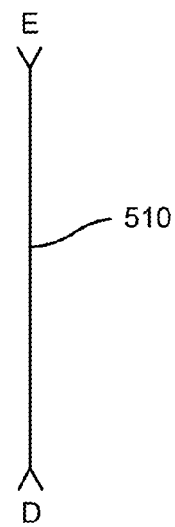 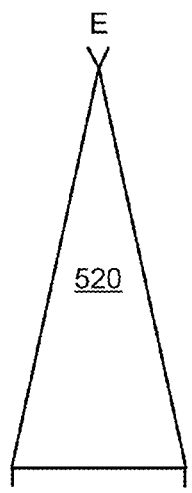 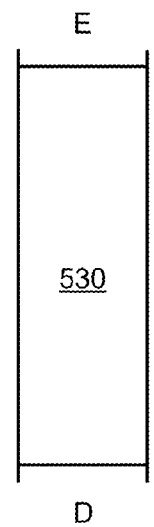
FIG. 5A  FIG. 5B  FIG. 5C

DETECTING MULTITOUCH EVENTS IN AN OPTICAL TOUCH-SENSITIVE DEVICE USING LINE IMAGES

CROSS REFERENCE TO RELATED APPLICATIONS

This application is a continuation in part of U.S. application Ser. No. 13/059,817 "Method and Apparatus for Detecting a Multitouch Event in an Optical Touch-Sensitive Device" filed on Feb. 18, 2011; which is the U.S. National Phase Application under 35 U.S.C. 371 of International Application No. PCT/EP2009/005736 "Method and Apparatus for Detecting a Multitouch Event in an Optical Touch-Sensitive Device" filed on Aug. 7, 2009; which claims priority to IE application S2008/0652 filed Aug. 7, 2008 and to IE application S2008/0827 filed Oct. 10, 2008.

This application is also a continuation in part of U.S. application Ser. No. 13/059,772 "Optical Control System With Modulated Emitters" filed on Feb. 18, 2011; which is the U.S. National Phase Application under 35 U.S.C. 371 of International Application No. PCT/EP2009/05739 "Optical Control System With Modulated Emitters" filed on Aug. 7, 2009; which claims priority to IE application S2008/0651 filed on Aug. 7, 2008.

The contents of these applications are incorporated by reference herein in their entirety.

BACKGROUND

1. Field of Art

This invention generally relates to detecting touch events in a touch-sensitive device, especially optical approaches capable of detecting multitouch events.

2. Description of the Related Art

Touch-sensitive displays for interacting with computing devices are becoming more common. A number of different technologies exist for implementing touch-sensitive displays and other touch-sensitive devices. Examples of these techniques include, for example, resistive touch screens, surface acoustic wave touch screens, capacitive touch screens and certain types of optical touch screens.

However, many of these approaches currently suffer from drawbacks. For example, some technologies may function well for small sized displays, as used in many modern mobile phones, but do not scale well to larger screen sizes as in displays used with laptop or even desktop computers. For technologies that require a specially processed surface or the use of special elements in the surface, increasing the screen size by a linear factor of N means that the special processing must be scaled to handle the $N^2$ larger area of the screen or that $N^2$ times as many special elements are required. This can result in unacceptably low yields or prohibitively high costs.

Another drawback for some technologies is their inability or difficulty in handling multitouch events. A multitouch event occurs when multiple touch events occur simultaneously. This can introduce ambiguities in the raw detected signals, which then must be resolved. Importantly, the ambiguities must be resolved in a speedy and computationally efficient manner. If too slow, then the technology will not be able to deliver the touch sampling rate required by the system. If too computationally intensive, then this will drive up the cost and power consumption of the technology.

Another drawback is that technologies may not be able to meet increasing resolution demands. Assume that the touch-sensitive surface is rectangular with length and width dimensions L×W. Further assume that an application requires that touch points be located with an accuracy of $\delta l$ and $\delta w$, respectively. The effective required resolution is then $R=(L\,W)/(\delta l\,\delta w)$. We will express R as the effective number of touch points. As technology progresses, the numerator in R generally will increase and the denominator generally will decrease, thus leading to an overall increasing trend for the required touch resolution R.

Thus, there is a need for improved touch-sensitive systems.

SUMMARY

An optical touch-sensitive device is able to determine the locations of multiple simultaneous touch events. The optical touch-sensitive device includes multiple emitters and detectors. Each emitter produces optical beams which are received by the detectors. The optical beams preferably are multiplexed in a manner so that many optical beams can be received by a detector simultaneously. Touch events disturb the optical beams. Line images of the touch events are captured, which are then used to determine the touch events.

In one aspect, information indicating which beams have been disturbed by touch events is received. The received information is used to determine line images of the touch events, where the line images are from the viewpoints of the emitters and/or detectors. The line images are used to determine the touch events.

Different sets of line images can be constructed. For example, line images can be constructed from the viewpoint of only emitters or only detectors. Beam patterns from multiple emitters and/or detectors can also be combined to produce line images. In one approach, the emitters and detectors are interleaved around the periphery of the surface, and the line image is produced by combining beam patterns from an emitter and an adjacent detector. In one implementation, the disturbance of beams is characterized by a transmission coefficient, and the lines images are determined from the transmission coefficients.

The line images themselves can be either binary or analog. Analog line images can be produced if the beams are wide and partially blocked or disturbed by the touch event. If the active area is rectangular in shape, a touch event close to one of the sides of the rectangular could cast a large shadow when viewed from one of the adjacent sides and a smaller shadow when viewed from the opposite side. A touch event located on the centreline is maximally distant from the two sides, and this type of touch event should cast a shadow which has a measurable effect on at least two pixels in the camera image. The resolution of the analog measurements preferably should be at least as high as the target spatial resolution in pixels at the periphery. For example, with pixel components (emitters or detectors) at a spacing of 5 mm and a target resolution of 1 mm, analog measurements preferably should have a minimum resolution of ⅕ of full scale.

For current day tablet and similarly sized devices, emitter/detector spacings preferably are in a range of 1-12 mm. For many applications, a spacing of 4-6 mm offers the capability of both good all-round resolution and good touch separation (i.e., the ability to distinguish individual touches which are close to each other).

Different approaches can be used to determine the touch evens based on the line images. Less computationally intensive approaches are generally preferred, especially for mobile devices. In one approach, "candidate lines" are determined from the line images. Touch events produce images of themselves in the line image. The actual touch event lies somewhere between the viewpoint of the line image, and the corresponding image of the touch event. Candidate lines can be drawn between these two points, thus representing possible locations for the touch event. The touch events can then be determined based on the candidate lines.

Other aspects include devices, systems and software related to the above.

BRIEF DESCRIPTION OF DRAWINGS

Embodiments of the present invention will now be described, by way of example, with reference to the accompanying drawings, in which:

FIG. 2 is a flow diagram for determining the locations of touch events, according to one embodiment.

FIGS. 3A-3F illustrate different mechanisms for a touch interaction with an optical beam.

FIG. 4 are graphs of binary and analog touch interactions.

FIGS. 5A-5C are top views of differently shaped beam footprints.

FIG. 13 is a flow diagram of a multi-pass method for determining touch locations.

DETAILED DESCRIPTION

I. Introduction

A. Device Overview

Figure 1:
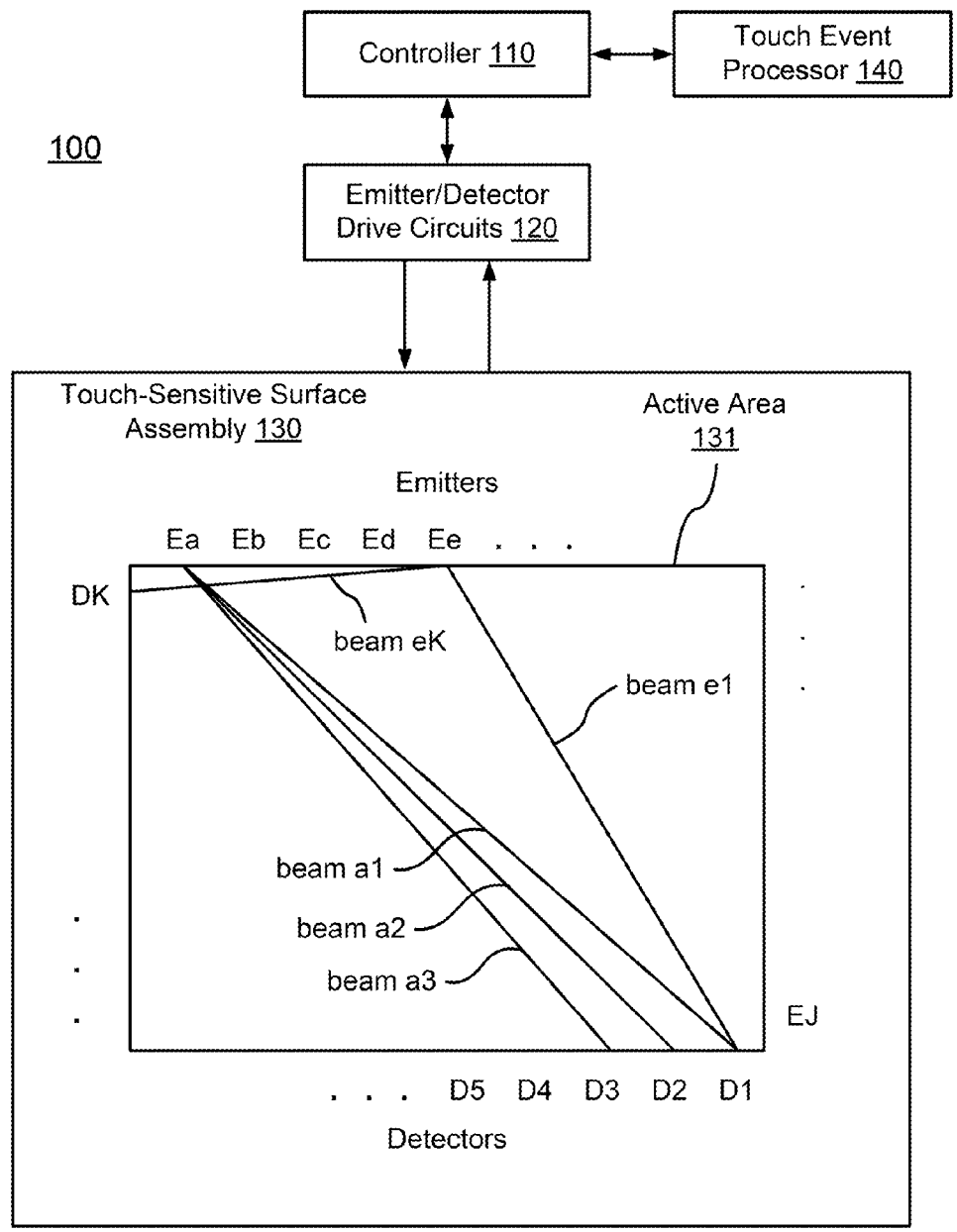
FIG. 1 is a diagram of an optical touch-sensitive device, according to one embodiment.

FIG. 1 is a diagram of an optical touch-sensitive device 100, according to one embodiment. The optical touch-sensitive device 100 includes a controller 110, emitter/detector drive circuits 120, and a touch-sensitive surface assembly 130. The surface assembly 130 includes a surface 131 over which touch events are to be detected. For convenience, the area defined by surface 131 may sometimes be referred to as the active area or active surface, even though the surface itself may be an entirely passive structure. The assembly 130 also includes emitters and detectors arranged along the periphery of the active surface 131. In this example, there are J emitters labeled as Ea-EJ and K detectors labeled as D1-DK. The device also includes a touch event processor 140, which may be implemented as part of the controller 110 or separately as shown in FIG. 1. A standardized API may be used to communicate with the touch event processor 140, for example between the touch event processor 140 and controller 110, or between the touch event processor 140 and other devices connected to the touch event processor.

The emitter/detector drive circuits 120 serve as an interface between the controller 110 and the emitters Ej and detectors Dk. The emitters produce optical "beams" which are received by the detectors. Preferably, the light produced by one emitter is received by more than one detector, and each detector receives light from more than one emitter. For convenience, "beam" will refer to the light from one emitter to one detector, even though it may be part of a large fan of light that goes to many detectors rather than a separate beam. The beam from emitter Ej to detector Dk will be referred to as beam jk. FIG. 1 expressly labels beams a1, a2, a3, e1 and eK as examples. Touches within the active area 131 will disturb certain beams, thus changing what is received at the detectors Dk. Data about these changes is communicated to the touch event processor 140, which analyzes the data to determine the location(s) (and times) of touch events on surface 131.

One advantage of an optical approach as shown in FIG. 1 is that this approach scales well to larger screen sizes. Since the emitters and detectors are positioned around the periphery, increasing the screen size by a linear factor of N means that the periphery also scales by a factor of N rather than $N^2$.

B. Process Overview

FIG. 2 is a flow diagram for determining the locations of touch events, according to one embodiment. This process will be illustrated using the device of FIG. 1. The process 200 is roughly divided into two phases, which will be referred to as a physical phase 210 and a processing phase 220. Conceptually, the dividing line between the two phases is a set of transmission coefficients Tjk.

The transmission coefficient Tjk is the transmittance of the optical beam from emitter j to detector k, compared to what would have been transmitted if there was no touch event interacting with the optical beam. In the following examples, we will use a scale of 0 (fully blocked beam) to 1 (fully transmitted beam). Thus, a beam jk that is undisturbed by a touch event has Tjk=1. A beam jk that is fully blocked by a touch event has a Tjk=0. A beam jk that is partially blocked or attenuated by a touch event has 0<Tjk<1. It is possible for Tjk>1, for example depending on the nature of the touch interaction or in cases where light is deflected or scattered to detectors k that it normally would not reach.

The use of this specific measure is purely an example. Other measures can be used. In particular, since we are most interested in interrupted beams, an inverse measure such as (1−Tjk) may be used since it is normally 0. Other examples include measures of absorption, attenuation, reflection or scattering. In addition, although FIG. 2 is explained using Tjk as the dividing line between the physical phase 210 and the processing phase 220, it is not required that Tjk be expressly calculated. Nor is a clear division between the physical phase 210 and processing phase 220 required.

Returning to FIG. 2, the physical phase 210 is the process of determining the Tjk from the physical setup. The processing phase 220 determines the touch events from the Tjk. The model shown in FIG. 2 is conceptually useful because it somewhat separates the physical setup and underlying physical mechanisms from the subsequent processing.

For example, the physical phase 210 produces transmission coefficients Tjk. Many different physical designs for the touch-sensitive surface assembly 130 are possible, and different design tradeoffs will be considered depending on the end application. For example, the emitters and detectors may be narrower or wider, narrower angle or wider angle, various wavelengths, various powers, coherent or not, etc. As another example, different types of multiplexing may be used to allow beams from multiple emitters to be received by each detector. Several of these physical setups and manners of operation are described below, primarily in Section II.

The interior of block 210 shows one possible implementation of process 210. In this example, emitters transmit 212 beams to multiple detectors. Some of the beams travelling across the touch-sensitive surface are disturbed by touch events. The detectors receive 214 the beams from the emitters in a multiplexed optical form. The received beams are de-multiplexed 216 to distinguish individual beams jk from each other. Transmission coefficients Tjk for each individual beam jk are then determined 218.

The processing phase 220 can also be implemented in many different ways. Candidate touch points, line imaging, location interpolation, touch event templates and multi-pass approaches are all examples of techniques that may be used as part of the processing phase 220. Several of these are described below, primarily in Section III.

II. Physical Set-Up

The touch-sensitive device 100 may be implemented in a number of different ways. The following are some examples of design variations.

A. Electronics

With respect to electronic aspects, note that FIG. 1 is exemplary and functional in nature. Functions from different boxes in FIG. 1 can be implemented together in the same component.

For example, the controller 110 and touch event processor 140 may be implemented as hardware, software or a combination of the two. They may also be implemented together (e.g., as an SoC with code running on a processor in the SoC) or separately (e.g., the controller as part of an ASIC, and the touch event processor as software running on a separate processor chip that communicates with the ASIC). Example implementations include dedicated hardware (e.g., ASIC or programmed field programmable gate array (FPGA)), and microprocessor or microcontroller (either embedded or standalone) running software code (including firmware). Software implementations can be modified after manufacturing by updating the software.

The emitter/detector drive circuits 120 serve as an interface between the controller 110 and the emitters and detectors. In one implementation, the interface to the controller 110 is at least partly digital in nature. With respect to emitters, the controller 110 may send commands controlling the operation of the emitters. These commands may be instructions, for example a sequence of bits which mean to take certain actions: start/stop transmission of beams, change to a certain pattern or sequence of beams, adjust power, power up/power down circuits. They may also be simpler signals, for example a "beam enable signal," where the emitters transmit beams when the beam enable signal is high and do not transmit when the beam enable signal is low.

The circuits 120 convert the received instructions into physical signals that drive the emitters. For example, circuit 120 might include some digital logic coupled to digital to analog converters, in order to convert received digital instructions into drive currents for the emitters. The circuit 120 might also include other circuitry used to operate the emitters: modulators to impress electrical modulations onto the optical beams (or onto the electrical signals driving the emitters), control loops and analog feedback from the emitters, for example. The emitters may also send information to the controller, for example providing signals that report on their current status.

With respect to the detectors, the controller 110 may also send commands controlling the operation of the detectors, and the detectors may return signals to the controller. The detectors also transmit information about the beams received by the detectors. For example, the circuits 120 may receive raw or amplified analog signals from the detectors. The circuits then may condition these signals (e.g., noise suppression), convert them from analog to digital form, and perhaps also apply some digital processing (e.g., demodulation).

B. Touch Interactions

Figure 3A:
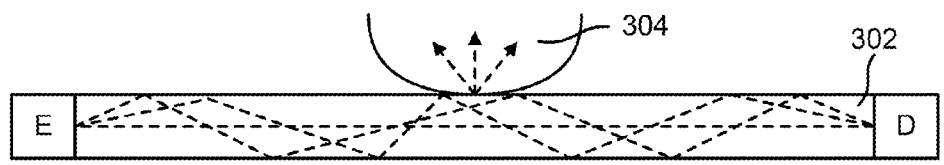

FIGS. 3A-3F illustrate different mechanisms for a touch interaction with an optical beam. FIG. 3A illustrates a mechanism based on frustrated total internal reflection (TIR). The optical beam, shown as a dashed line, travels from emitter E to detector D through an optically transparent planar waveguide 302. The beam is confined to the waveguide 302 by total internal reflection. The waveguide may be constructed of plastic or glass, for example. An object 304, such as a finger or stylus, coming into contact with the transparent waveguide 302, has a higher refractive index than the air normally surrounding the waveguide. Over the area of contact, the increase in the refractive index due to the object disturbs the total internal reflection of the beam within the waveguide. The disruption of total internal reflection increases the light leakage from the waveguide, attenuating any beams passing through the contact area. Correspondingly, removal of the object 304 will stop the attenuation of the beams passing through. Attenuation of the beams passing through the touch point will result in less power at the detectors, from which the reduced transmission coefficients Tjk can be calculated.

Figure 3B:

FIG. 3B illustrates a mechanism based on beam blockage. Emitters produce beams which are in close proximity to a surface 306. An object 304 coming into contact with the surface 306 will partially or entirely block beams within the contact area. FIGS. 3A and 3B illustrate some physical mechanisms for touch interactions, but other mechanisms can also be used. For example, the touch interaction may be based on changes in polarization, scattering, or changes in propagation direction or propagation angle (either vertically or horizontally).

Figure 3C:
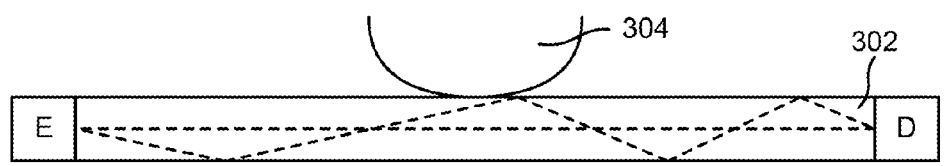

For example, FIG. 3C illustrates a different mechanism based on propagation angle. In this example, the optical beam is guided in a waveguide 302 via TIR. The optical beam hits the waveguide-air interface at a certain angle and is reflected back at the same angle. However, the touch 304 changes the angle at which the optical beam is propagating. In FIG. 3C, the optical beam travels at a steeper angle of propagation after the touch 304. The detector D has a response that varies as a function of the angle of propagation. The detector D could be more sensitive to the optical beam travelling at the original angle of propagation or it could be less sensitive. Regardless, an optical beam that is disturbed by a touch 304 will produce a different response at detector D.

Figure 3D:
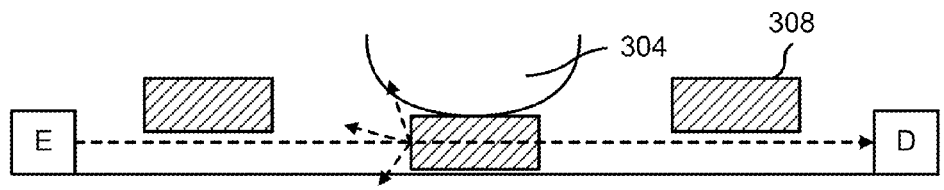

In FIGS. 3A-3C, the touching object was also the object that interacted with the beam. This will be referred to as a direct interaction. In an indirect interaction, the touching object interacts with an intermediate object, which interacts with the optical beam. FIG. 3D shows an example that uses intermediate blocking structures 308. Normally, these structures 308 do not block the beam. However, in FIG. 3D, object 304 contacts the blocking structure 308, which causes it to partially or entirely block the optical beam. In FIG. 3D, the structures 308 are shown as discrete objects, but they do not have to be so.

Figure 3E:

In FIG. 3E, the intermediate structure 310 is a compressible, partially transmitting sheet. When there is no touch, the sheet attenuates the beam by a certain amount. In FIG. 3E, the touch 304 compresses the sheet, thus changing the attenuation of the beam. For example, the upper part of the sheet may be more opaque than the lower part, so that compression decreases the transmittance. Alternately, the sheet may have a certain density of scattering sites. Compression increases the density in the contact area, since the same number of scattering sites occupies a smaller volume, thus decreasing the transmittance. Analogous indirect approaches can also be used for frustrated TIR. Note that this approach could be used to measure contact pressure or touch velocity, based on the degree or rate of compression.

The touch mechanism may also enhance transmission, instead of or in addition to reducing transmission. For example, the touch interaction in FIG. 3E might increase the transmission instead of reducing it. The upper part of the sheet may be more transparent than the lower part, so that compression increases the transmittance.

FIG. 3F shows another example where the transmittance between an emitter and detector increases due to a touch interaction. FIG. 3F is a top view. Emitter Ea normally produces a beam that is received by detector D1. When there is no touch interaction, Ta1=1 and Ta2=0. However, a touch interaction 304 blocks the beam from reaching detector D1 and scatters some of the blocked light to detector D2. Thus, detector D2 receives more light from emitter Ea than it normally would. Accordingly, when there is a touch event 304, Ta1 decreases and Ta2 increases.

For simplicity, in the remainder of this description, the touch mechanism will be assumed to be primarily of a blocking nature, meaning that a beam from an emitter to a detector will be partially or fully blocked by an intervening touch event. This is not required, but it is convenient to illustrate various concepts.

For convenience, the touch interaction mechanism may sometimes be classified as either binary or analog. A binary interaction is one that basically has two possible responses as a function of the touch. Examples includes non-blocking and fully blocking, or non-blocking and 10%+ attenuation, or not frustrated and frustrated TIR. An analog interaction is one that has a "grayscale" response to the touch: non-blocking passing through gradations of partially blocking to blocking Whether the touch interaction mechanism is binary or analog depends in part on the nature of the interaction between the touch and the beam. It does not depend on the lateral width of the beam (which can also be manipulated to obtain a binary or analog attenuation, as described below), although it might depend on the vertical size of the beam.

FIG. 4 is a graph illustrating a binary touch interaction mechanism compared to an analog touch interaction mechanism. FIG. 4 graphs the transmittance Tjk as a function of the depth z of the touch. The dimension z is into and out of the active surface. Curve 410 is a binary response. At low z (i.e., when the touch has not yet disturbed the beam), the transmittance Tjk is at its maximum. However, at some point $z_0$, the touch breaks the beam and the transmittance Tjk falls fairly suddenly to its minimum value. Curve 420 shows an analog response where the transition from maximum Tjk to minimum Tjk occurs over a wider range of z. If curve 420 is well behaved, it is possible to estimate z from the measured value of Tjk.

C. Emitters, Detectors and Couplers

Each emitter transmits light to a number of detectors. Usually, each emitter outputs light to more than one detector simultaneously. Similarly, each detector receives light from a number of different emitters. The optical beams may be visible, infrared and/or ultraviolet light. The term "light" is meant to include all of these wavelengths and terms such as "optical" are to be interpreted accordingly.

Examples of the optical sources for the emitters include light emitting diodes (LEDs) and semiconductor lasers. IR sources can also be used. Modulation of optical beams can be achieved by directly modulating the optical source or by using an external modulator, for example a liquid crystal modulator or a deflected mirror modulator. Examples of sensor elements for the detector include charge coupled devices, photodiodes, photoresistors, phototransistors, and nonlinear all-optical detectors. Typically, the detectors output an electrical signal that is a function of the intensity of the received optical beam.

The emitters and detectors may also include optics and/or electronics in addition to the main optical source and sensor element. For example, optics can be used to couple between the emitter/detector and the desired beam path. Optics can also reshape or otherwise condition the beam produced by the emitter or accepted by the detector. These optics may include lenses, Fresnel lenses, mirrors, filters, non-imaging optics and other optical components.

In this disclosure, the optical paths will be shown unfolded for clarity. Thus, sources, optical beams and sensors will be shown as lying in one plane. In actual implementations, the sources and sensors typically will not lie in the same plane as the optical beams. Various coupling approaches can be used. A planar waveguide or optical fiber may be used to couple light to/from the actual beam path. Free space coupling (e.g., lenses and mirrors) may also be used. A combination may also be used, for example waveguided along one dimension and free space along the other dimension. Various coupler designs are described in U.S. application Ser. No. 61/510,989 "Optical Coupler" filed on Jul. 22, 2011, which is incorporated by reference in its entirety herein.

D. Optical Beam Paths

Another aspect of a touch-sensitive system is the shape and location of the optical beams and beam paths. In FIGS. 1-2, the optical beams are shown as lines. These lines should be interpreted as representative of the beams, but the beams themselves are not necessarily narrow pencil beams. FIGS. 5A-5C illustrate different beam shapes.

FIG. 5A shows a point emitter E, point detector D and a narrow "pencil" beam 510 from the emitter to the detector. In FIG. 5B, a point emitter E produces a fan-shaped beam 520 received by the wide detector D. In FIG. 5C, a wide emitter E produces a "rectangular" beam 530 received by the wide detector D. These are top views of the beams and the shapes shown are the footprints of the beam paths. Thus, beam 510 has a line-like footprint, beam 520 has a triangular footprint which is narrow at the emitter and wide at the detector, and beam 530 has a fairly constant width rectangular footprint. In FIG. 5, the detectors and emitters are represented by their widths, as seen by the beam path. The actual optical sources and sensors may not be so wide. Rather, optics (e.g., cylindrical lenses or mirrors) can be used to effectively widen or narrow the lateral extent of the actual sources and sensors.

Figure 6A:
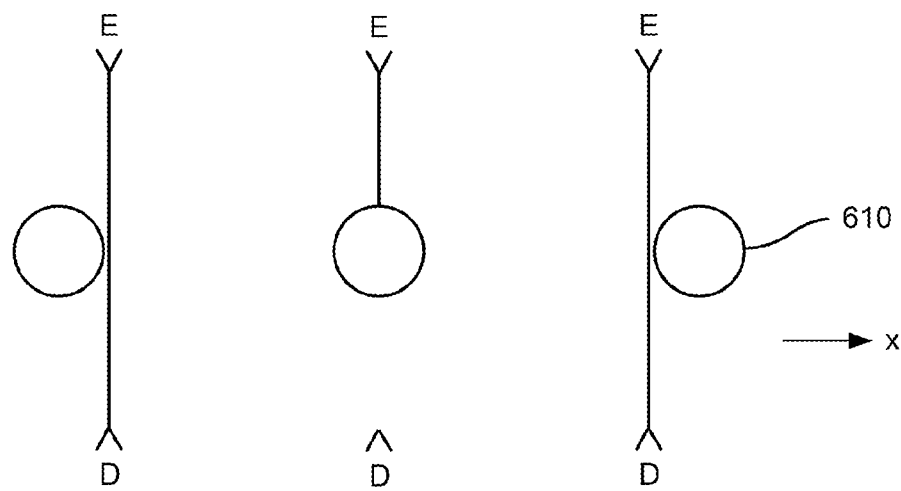
FIGS. 6A-6B are top views illustrating a touch point travelling through a narrow beam and a wide beam, respectively.
Figure 6B:
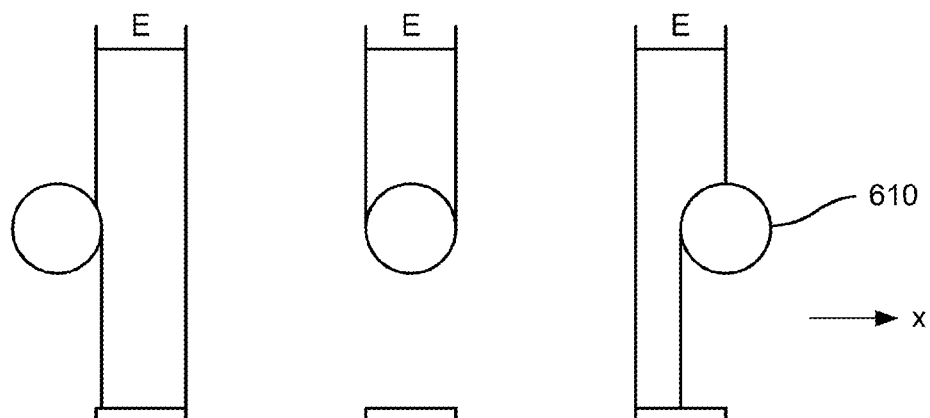
Figure 7:
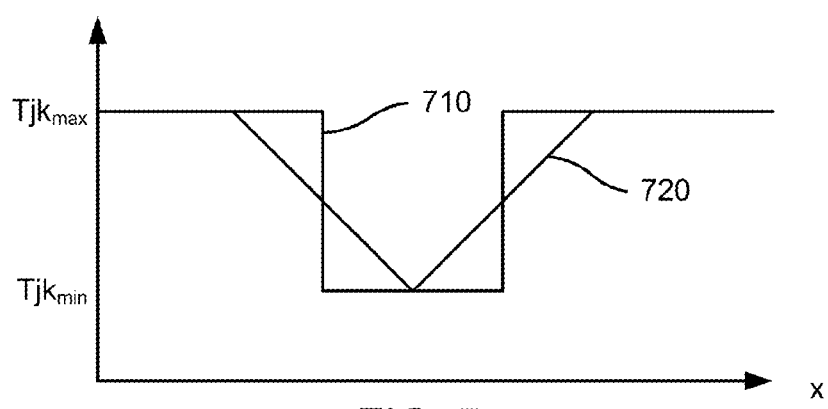
FIG. 7 are graphs of the binary and analog responses for the narrow and wide beams of FIG. 6.

FIGS. 6A-6B and 7 show how the width of the footprint can determine whether the transmission coefficient Tjk behaves as a binary or analog quantity. In these figures, a touch point has contact area 610. Assume that the touch is fully blocking, so that any light that hits contact area 610 will be blocked.

FIG. 6A shows what happens as the touch point moves left to right past a narrow beam. In the leftmost situation, the beam is not blocked at all (i.e., maximum Tjk) until the right edge of the contact area 610 interrupts the beam. At this point, the beam is fully blocked (i.e., minimum Tjk), as is also the case in the middle scenario. It continues as fully blocked until the entire contact area moves through the beam. Then, the beam is again fully unblocked, as shown in the righthand scenario. Curve 710 in FIG. 7 shows the transmittance Tjk as a function of the lateral position x of the contact area 610. The sharp transitions between minimum and maximum Tjk show the binary nature of this response.

FIG. 6B shows what happens as the touch point moves left to right past a wide beam. In the leftmost scenario, the beam is just starting to be blocked. The transmittance Tjk starts to fall off but is at some value between the minimum and maximum values. The transmittance Tjk continues to fall as the touch point blocks more of the beam, until the middle situation where the beam is fully blocked. Then the transmittance Tjk starts to increase again as the contact area exits the beam, as shown in the righthand situation. Curve 720 in FIG. 7 shows the transmittance Tjk as a function of the lateral position x of the contact area 610. The transition over a broad range of x shows the analog nature of this response.

FIGS. 5-7 consider an individual beam path. In most implementations, each emitter and each detector will support multiple beam paths.

Figure 8A:
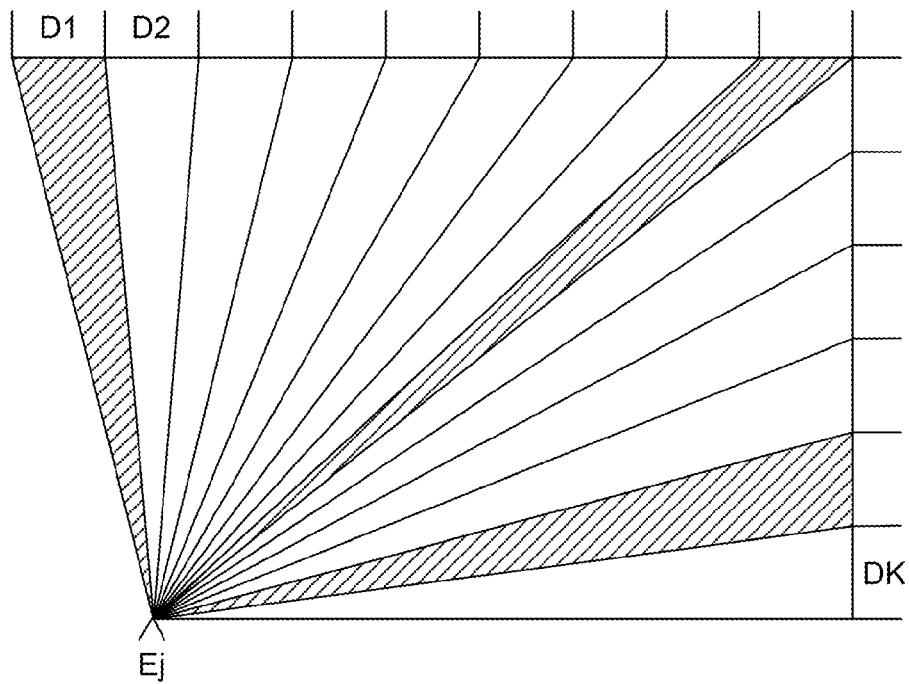
FIGS. 8A-8B are top views illustrating active area coverage by emitters.
Figure 8B:
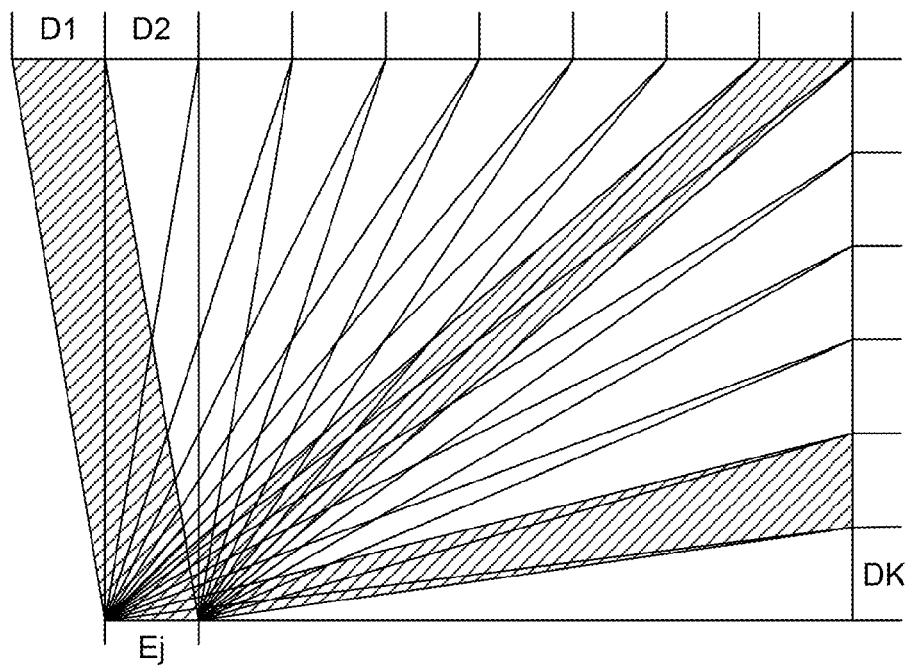

FIG. 8A is a top view illustrating the beam pattern produced by a point emitter. Emitter Ej transmits beams to wide detectors D1-DK. Three beams are shaded for clarity: beam j1, beam j(K−1) and an intermediate beam. Each beam has a fan-shaped footprint. The aggregate of all footprints is emitter Ej's coverage area. That is, any touch event that falls within emitter Ej's coverage area will disturb at least one of the beams from emitter Ej. FIG. 8B is a similar diagram, except that emitter Ej is a wide emitter and produces beams with "rectangular" footprints (actually, trapezoidal but we will refer to them as rectangular). The three shaded beams are for the same detectors as in FIG. 8A.

Note that every emitter Ej may not produce beams for every detector Dk. In FIG. 1, consider beam path aK which would go from emitter Ea to detector DK. First, the light produced by emitter Ea may not travel in this direction (i.e., the radiant angle of the emitter may not be wide enough) so there may be no physical beam at all, or the acceptance angle of the detector may not be wide enough so that the detector does not detect the incident light. Second, even if there was a beam and it was detectable, it may be ignored because the beam path is not located in a position to produce useful information. Hence, the transmission coefficients Tjk may not have values for all combinations of emitters Ej and detectors Dk.

The footprints of individual beams from an emitter and the coverage area of all beams from an emitter can be described using different quantities. Spatial extent (i.e., width), angular extent (i.e., radiant angle for emitters, acceptance angle for detectors) and footprint shape are quantities that can be used to describe individual beam paths as well as an individual emitter's coverage area.

An individual beam path from one emitter Ej to one detector Dk can be described by the emitter Ej's width, the detector Dk's width and/or the angles and shape defining the beam path between the two.

These individual beam paths can be aggregated over all detectors for one emitter Ej to produce the coverage area for emitter Ej. Emitter Ej's coverage area can be described by the emitter Ej's width, the aggregate width of the relevant detectors Dk and/or the angles and shape defining the aggregate of the beam paths from emitter Ej. Note that the individual footprints may overlap (see FIG. 8B close to the emitter). Therefore an emitter's coverage area may not be equal to the sum of its footprints. The ratio of (the sum of an emitter's footprints)/(emitter's cover area) is one measure of the amount of overlap.

The coverage areas for individual emitters can be aggregated over all emitters to obtain the overall coverage for the system. In this case, the shape of the overall coverage area is not so interesting because it should cover the entirety of the active area 131. However, not all points within the active area 131 will be covered equally. Some points may be traversed by many beam paths while other points traversed by far fewer. The distribution of beam paths over the active area 131 may be characterized by calculating how many beam paths traverse different (x,y) points within the active area. The orientation of beam paths is another aspect of the distribution. An (x,y) point that is derived from three beam paths that are all running roughly in the same direction usually will be a weaker distribution than a point that is traversed by three beam paths that all run at 60 degree angles to each other.

Figure 8C:
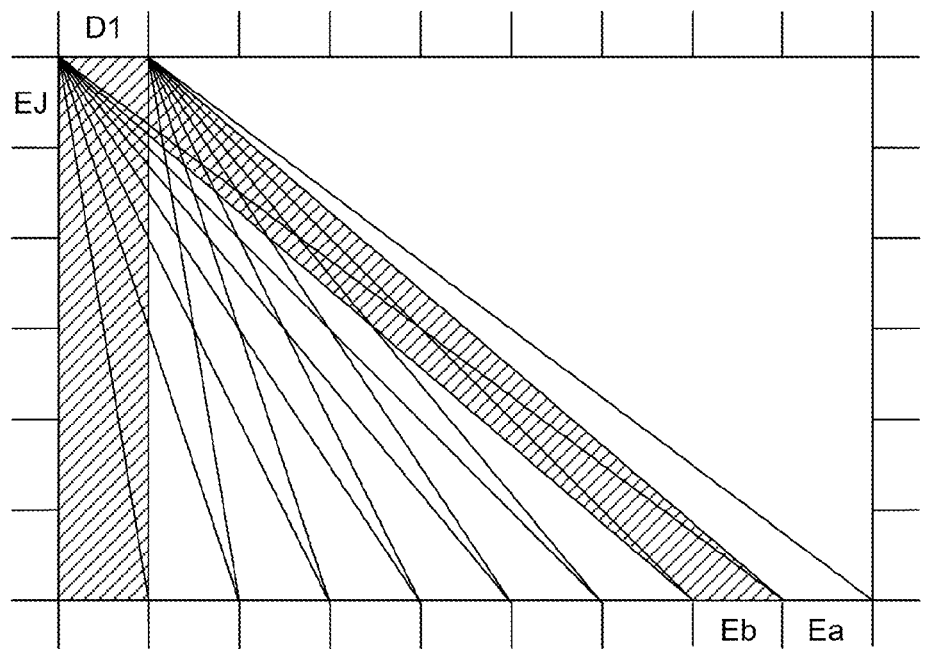
FIGS. 8C-8D are top views illustrating active area coverage by detectors.
Figure 8D:
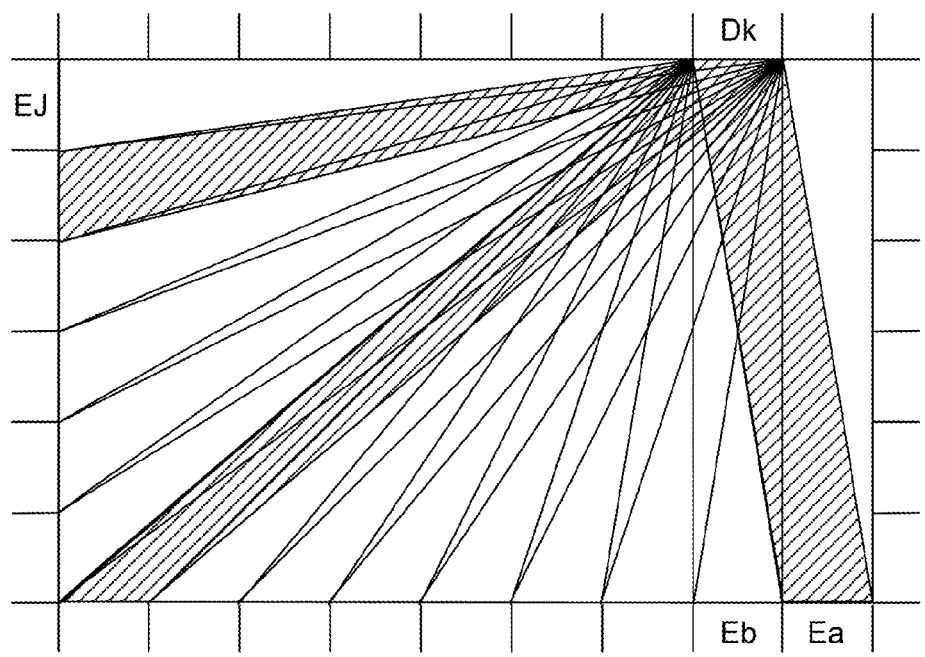

The discussion above for emitters also holds for detectors. The diagrams constructed for emitters in FIGS. 8A-8B can also be constructed for detectors. For example, FIG. 8C shows a similar diagram for detector D1 of FIG. 8B. That is, FIG. 8C shows all beam paths received by detector D1. Note that in this example, the beam paths to detector D1 are only from emitters along the bottom edge of the active area. The emitters on the left edge are not worth connecting to D1 and there are no emitters on the right edge (in this example design). FIG. 8D shows a diagram for detector Dk, which is an analogous position to emitter Ej in FIG. 8B.

A detector Dk's coverage area is then the aggregate of all footprints for beams received by a detector Dk. The aggregate of all detector coverage areas gives the overall system coverage.

E. Active Area Coverage

The coverage of the active area 131 depends on the shapes of the beam paths, but also depends on the arrangement of emitters and detectors. In most applications, the active area is rectangular in shape, and the emitters and detectors are located along the four edges of the rectangle.

Figure 8E:
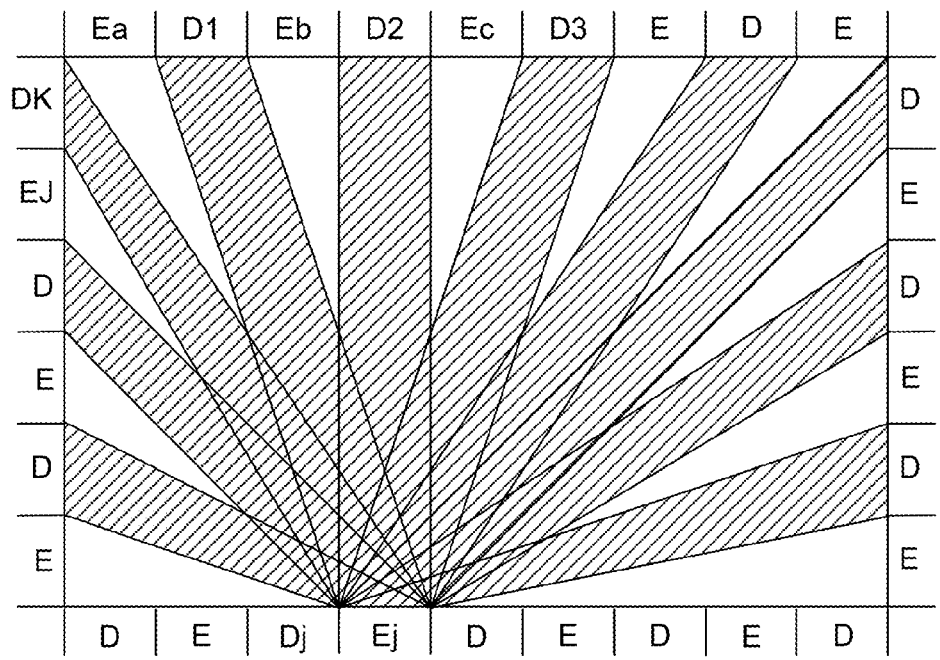
FIG. 8E is a top view illustrating alternating emitters and detectors.

In a preferred approach, rather than having only emitters along certain edges and only detectors along the other edges, emitters and detectors are interleaved along the edges. FIG. 8E shows an example of this where emitters and detectors are alternated along all four edges. The shaded beams show the coverage area for emitter Ej.

F. Multiplexing

Since multiple emitters transmit multiple optical beams to multiple detectors, and since the behavior of individual beams is generally desired, a multiplexing/demultiplexing scheme is used. For example, each detector typically outputs a single electrical signal indicative of the intensity of the incident light, regardless of whether that light is from one optical beam produced by one emitter or from many optical beams produced by many emitters. However, the transmittance Tjk is a characteristic of an individual optical beam jk.

Different types of multiplexing can be used. Depending upon the multiplexing scheme used, the transmission characteristics of beams, including their content and when they are transmitted, may vary. Consequently, the choice of multiplexing scheme may affect both the physical construction of the optical touch-sensitive device as well as its operation.

One approach is based on code division multiplexing. In this approach, the optical beams produced by each emitter are encoded using different codes. A detector receives an optical signal which is the combination of optical beams from different emitters, but the received beam can be separated into its components based on the codes. This is described in further detail in U.S. application Ser. No. 13/059,772 "Optical Control System With Modulated Emitters," which is incorporated by reference herein.

Another similar approach is frequency division multiplexing. In this approach, rather than modulated by different codes, the optical beams from different emitters are modulated by different frequencies. The frequencies are low enough that the different components in the detected optical beam can be recovered by electronic filtering or other electronic or software means.

Time division multiplexing can also be used. In this approach, different emitters transmit beams at different times. The optical beams and transmission coefficients Tjk are identified based on timing. If only time multiplexing is used, the controller must cycle through the emitters quickly enough to meet the required touch sampling rate.

Other multiplexing techniques commonly used with optical systems include wavelength division multiplexing, polarization multiplexing, spatial multiplexing and angle multiplexing. Electronic modulation schemes, such as PSK, QAM and OFDM, may also be possibly applied to distinguish different beams.

Several multiplexing techniques may be used together. For example, time division multiplexing and code division multiplexing could be combined. Rather than code division multiplexing 128 emitters or time division multiplexing 128 emitters, the emitters might be broken down into 8 groups of 16. The 8 groups are time division multiplexed so that only 16 emitters are operating at any one time, and those 16 emitters are code division multiplexed. This might be advantageous, for example, to minimize the number of emitters active at any given point in time to reduce the power requirements of the device.

III. Processing Phase

In the processing phase 220 of FIG. 2, the transmission coefficients Tjk are used to determine the locations of touch points. Different approaches and techniques can be used, including candidate touch points, line imaging, location interpolation, touch event templates, multi-pass processing and beam weighting.

A. Candidate Touch Points

One approach to determine the location of touch points is based on identifying beams that have been affected by a touch event (based on the transmission coefficients Tjk) and then identifying intersections of these interrupted beams as candidate touch points. The list of candidate touch points can be refined by considering other beams that are in proximity to the candidate touch points or by considering other candidate touch points. This approach is described in further detail in U.S. patent application Ser. No. 13/059,817, "Method and Apparatus for Detecting a Multitouch Event in an Optical Touch-Sensitive Device," which is incorporated herein by reference.

B. Line Imaging

This technique is based on the concept that the set of beams received by a detector form a line image of the touch points, where the viewpoint is the detector's location. The detector functions as a one-dimensional camera that is looking at the collection of emitters. Due to reciprocity, the same is also true for emitters. The set of beams transmitted by an emitter form a line image of the touch points, where the viewpoint is the emitter's location.

FIGS. 9-10 illustrate this concept using the emitter/detector layout shown in FIGS. 8B-8D. For convenience, the term "beam terminal" will be used to refer to emitters and detectors. Thus, the set of beams from a beam terminal (which could be either an emitter or a detector) form a line image of the touch points, where the viewpoint is the beam terminal's location.

Figure 9A:
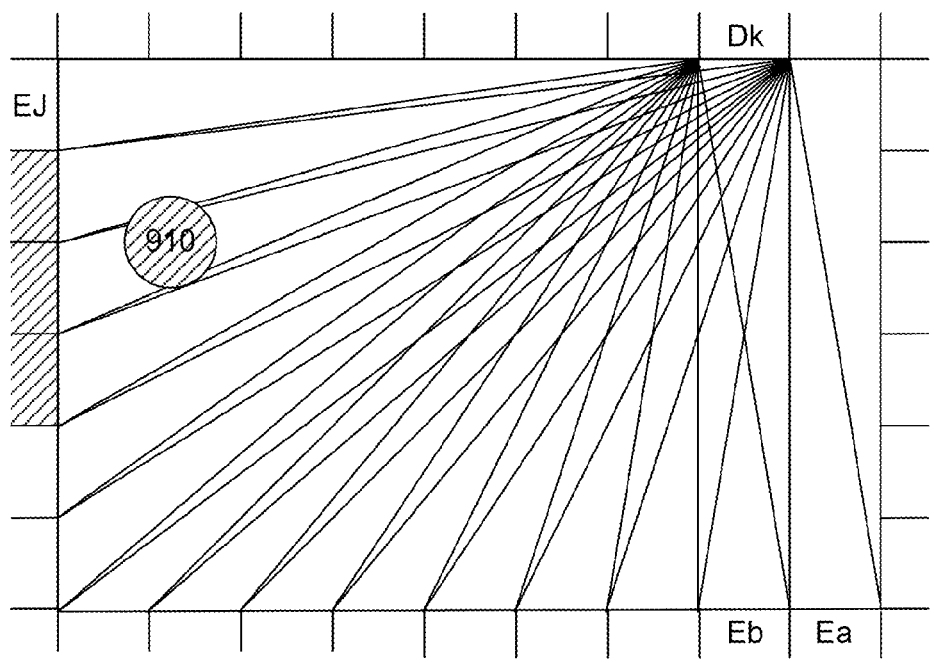
FIGS. 9A-9C are top views illustrating beam patterns interrupted by a touch point, from the viewpoint of different beam terminals.
Figure 9B:
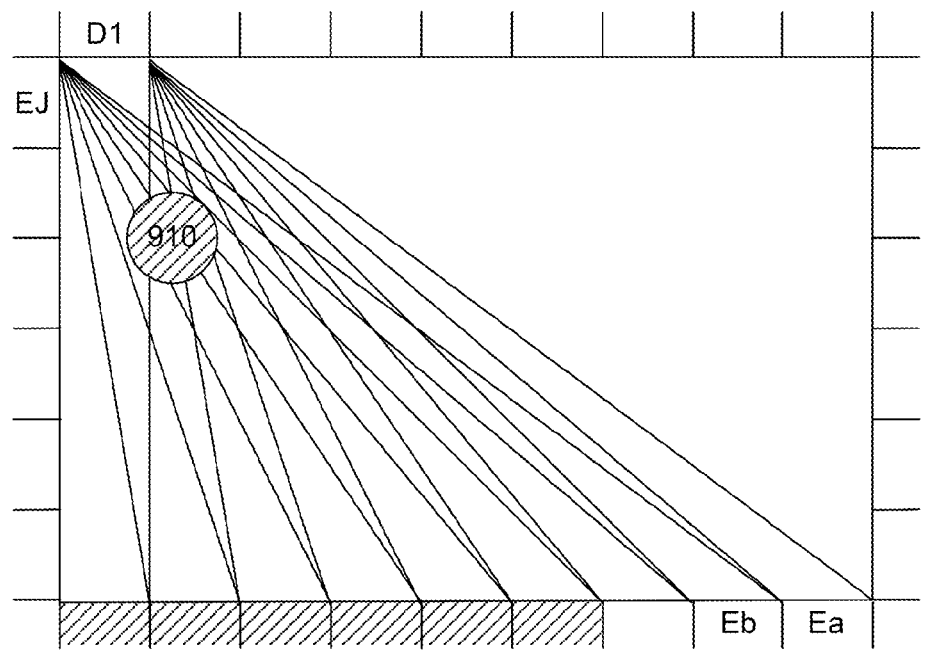
Figure 9C:
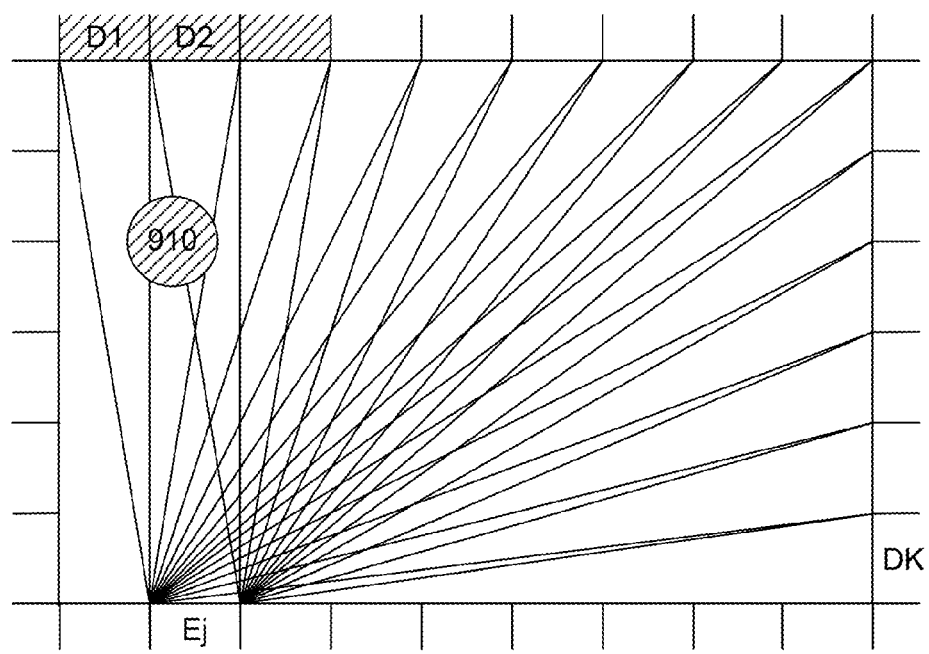
Figure 10A:
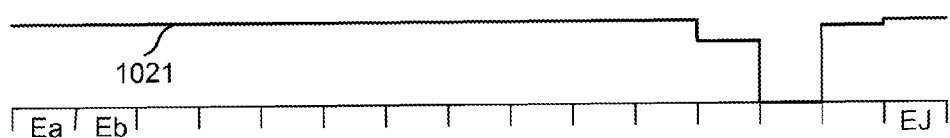
FIGS. 10A-10C are graphs of line images corresponding to the cases shown in FIGS. 9A-9C.

FIGS. 9A-C shows the physical set-up of active area, emitters and detectors. In this example, there is a touch point with contact area 910. FIG. 9A shows the beam pattern for beam terminal Dk, which are all the beams from emitters Ej to detector Dk. A shaded emitter indicates that beam is interrupted, at least partially, by the touch point 910. FIG. 10A shows the corresponding line image 1021 "seen" by beam terminal Dk. The beams to terminals Ea, Eb, . . . E(J–4) are uninterrupted so the transmission coefficient is at full value. The touch point appears as an interruption to the beams with beam terminals E(J–3), E(J–2) and E(J–1), with the main blockage for terminal E(J–2). That is, the portion of the line image spanning beam terminals E(J–3) to E(J–1) is a one-dimensional image of the touch event.

Figure 10B:
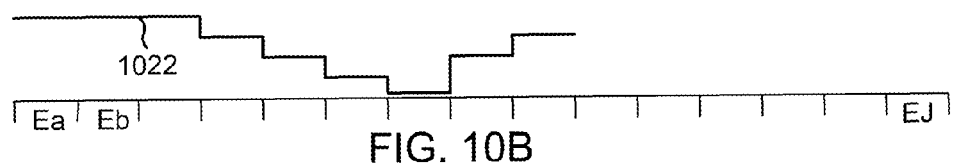
Figure 10C:
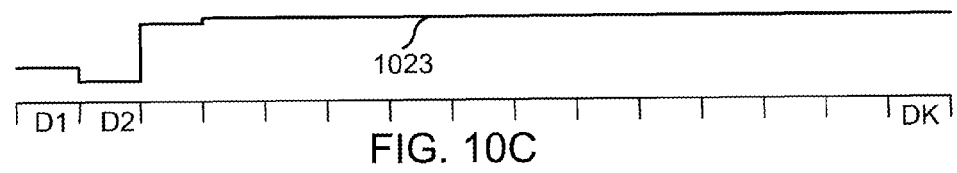

FIG. 9B shows the beam pattern for beam terminal D1 and FIG. 10B shows the corresponding line image 1022 seen by beam terminal D1. Note that the line image does not span all emitters because the emitters on the left edge of the active area do not form beam paths with detector D1. FIGS. 9C and 10C show the beam patterns and corresponding line image 1023 seen by beam terminal Ej.

The example in FIGS. 9-10 use wide beam paths. However, the line image technique may also be used with narrow or fan-shaped beam paths.

FIGS. 10A-C show different images of touch point 910. The location of the touch event can be determined by processing the line images. For example, approaches based on correlation or computerized tomography algorithms can be used to determine the location of the touch event 910. However, simpler approaches are preferred because they require less compute resources.

Figure 9D:
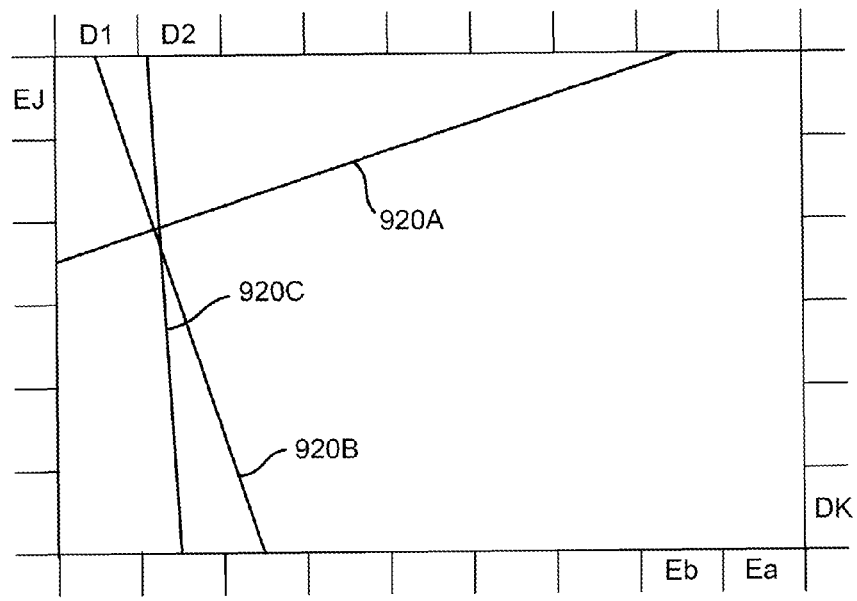
FIG. 9D is a top view illustrating estimation of the touch point, based on the interrupted beams of FIGS. 9A-9C and the line images of FIGS. 10A-10C.

The touch point 910 casts a "shadow" in each of the lines images 1021-1023. One approach is based on finding the edges of the shadow in the line image and using the pixel values within the shadow to estimate the center of the shadow. A line can then be drawn from a location representing the beam terminal to the center of the shadow. The touch point is assumed to lie along this line somewhere. That is, the line is a candidate line for positions of the touch point. FIG. 9D shows this. In FIG. 9D, line 920A is the candidate line corresponding to FIGS. 9A and 10A. That is, it is the line from the center of detector Dk to the center of the shadow in line image 1021. Similarly, line 920B is the candidate line corresponding to FIGS. 9B and 10B, and line 920C is the line corresponding to FIGS. 9C and 10C. The resulting candidate lines 920A-C have one end fixed at the location of the beam terminal, with the angle of the candidate line interpolated from the shadow in the line image. The center of the touch event can be estimated by combining the intersections of these candidate lines.

Each line image shown in FIG. 10 was produced using the beam pattern from a single beam terminal to all of the corresponding complimentary beam terminals (i.e., beam pattern from one detector to all corresponding emitters, or from one emitter to all corresponding detectors). As another variation, the line images could be produced by combining information from beam patterns of more than one beam terminal. FIG. 8E shows the beam pattern for emitter Ej. However, the corresponding line image will have gaps because the corresponding detectors do not provide continuous coverage. They are interleaved with emitters. However, the beam pattern for the adjacent detector Dj produces a line image that roughly fills in these gaps. Thus, the two partial line images from emitter Ej and detector Dj can be combined to produce a complete line image.

The number of emitters and detectors, and the size and number of line images will vary by application. Small size line images and a small number of lines images can be sufficient to detect single touches or a few touches. For example, in these applications, lines images that span a field of view of 5 degrees, 10 degrees or 20 degrees can be sufficient. Wide line images can be useful for detecting multiple touch points. Example fields of view can be 45 degrees, 60 degrees, 90 degrees, 120 degrees or even larger. In order to implement these large fields of view, the emitters and detectors must have correspondingly wide radiant angles and acceptance angles.

The size of the line images can also be expressed relative to the perimeter of the active area. If the active surface is rectangular in shape, then broader line images might span at least one half of one side of the rectangle, at least one side of the rectangle, at least two adjacent sides of the rectangle, or at least half the perimeter of the rectangle.

To determine the location of a touch event based solely on line images, at least 2 line images are required. Preferably at least 4, or alternately 8, line images are determined. If there are a total of N beam terminals arranged around the perimeter, preferably at least N/2 line images are determined. In terms of actual spacing, for tablet and similarly sized devices, if the perimeter has a length of L inches, then preferably at least 2L line images are determined.

C. Location Interpolation

Applications typically will require a certain level of accuracy in locating touch points. One approach to increase accuracy is to increase the density of emitters, detectors and beam paths so that a small change in the location of the touch point will interrupt different beams.

Another approach is to interpolate between beams. In the line images of FIGS. 10A-C, the touch point interrupts several beams but the interruption has an analog response due to the beam width. Therefore, although the beam terminals may have a spacing of $\Delta$, the location of the touch point can be determined with greater accuracy by interpolating based on the analog values. This is also shown in curve 720 of FIG. 7. The measured Tjk can be used to interpolate the x position.

Figure 11A:
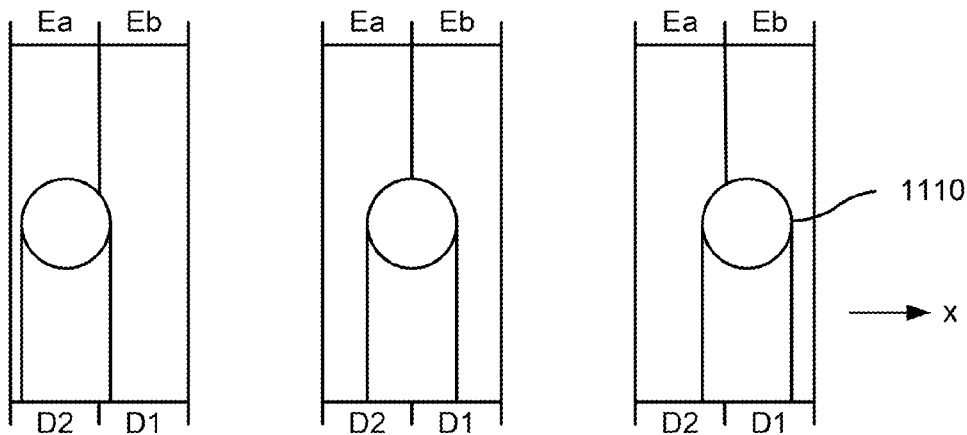
FIG. 11A is a top view illustrating a touch point travelling through two adjacent wide beams.
Figure 11B:
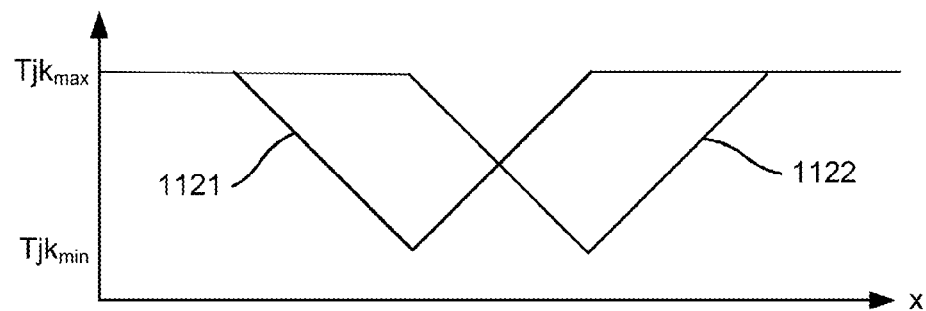
FIG. 11B are graphs of the analog responses for the two wide beams of FIG. 11A.

FIGS. 11A-B show one approach based on interpolation between adjacent beam paths. FIG. 11A shows two beam paths a2 and b1. Both of these beam paths are wide and they are adjacent to each other. In all three cases shown in FIG. 11A, the touch point 1110 interrupts both beams. However, in the lefthand scenario, the touch point is mostly interrupting beam a2. In the middle case, both beams are interrupted equally. In the righthand case, the touch point is mostly interrupting beam b1.

FIG. 11B graphs these two transmission coefficients as a function of x. Curve 1121 is for coefficient Ta2 and curve 1122 is for coefficient Tb1. By considering the two transmission coefficients Ta2 and Tb1, the x location of the touch point can be interpolated. For example, the interpolation can be based on the difference or ratio of the two coefficients.

The interpolation accuracy can be enhanced by accounting for any uneven distribution of light across the beams a2 and b1. For example, if the beam cross section is Gaussian, this can be taken into account when making the interpolation. In another variation, if the wide emitters and detectors are themselves composed of several emitting or detecting units, these can be decomposed into the individual elements to determine more accurately the touch location. This may be done as a secondary pass, having first determined that there is touch activity in a given location with a first pass. A wide emitter can be approximated by driving several adjacent emitters simultaneously. A wide detector can be approximated by combining the outputs of several detectors to form a single signal.

Figure 11C:
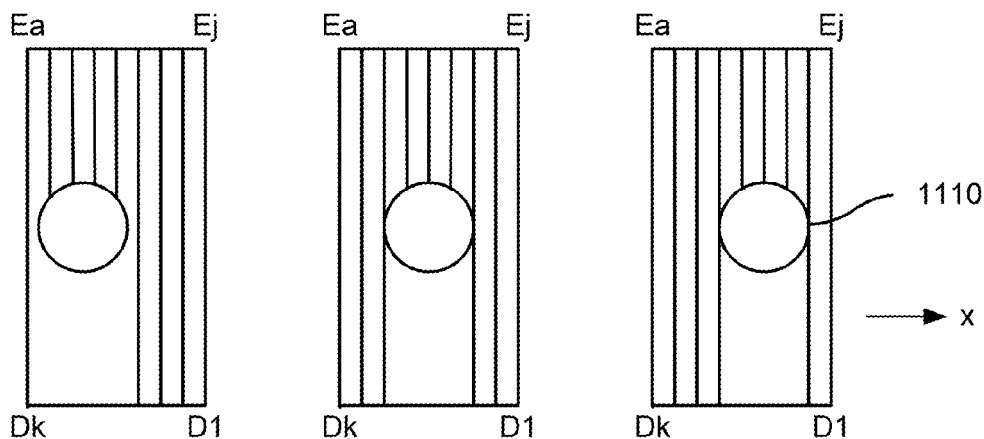
FIG. 11C is a top view illustrating a touch point travelling through many adjacent narrow beams.

FIG. 11C shows a situation where a large number of narrow beams is used rather than interpolating a fewer number of wide beams. In this example, each beam is a pencil beam represented by a line in FIG. 11C. As the touch point 1110 moves left to right, it interrupts different beams. Much of the resolution in determining the location of the touch point 1110 is achieved by the fine spacing of the beam terminals. The edge beams may be interpolated to provide an even finer location estimate.

D. Touch Event Templates

If the locations and shapes of the beam paths are known, which is typically the case for systems with fixed emitters, detectors and optics, it is possible to predict in advance the transmission coefficients for a given touch event. Templates can be generated a priori for expected touch events. The determination of touch events then becomes a template matching problem.

If a brute force approach is used, then one template can be generated for each possible touch event. However, this can result in a large number of templates. For example, assume that one class of touch events is modeled as oval contact areas and assume that the beams are pencil beams that are either fully blocked or fully unblocked. This class of touch events can be parameterized as a function of five dimensions: length of major axis, length of minor axis, orientation of major axis, x location within the active area and y location within the active area. A brute force exhaustive set of templates covering this class of touch events must span these five dimensions. In addition, the template itself may have a large number of elements. Thus, it is desirable to simplify the set of templates.

Figure 12A:
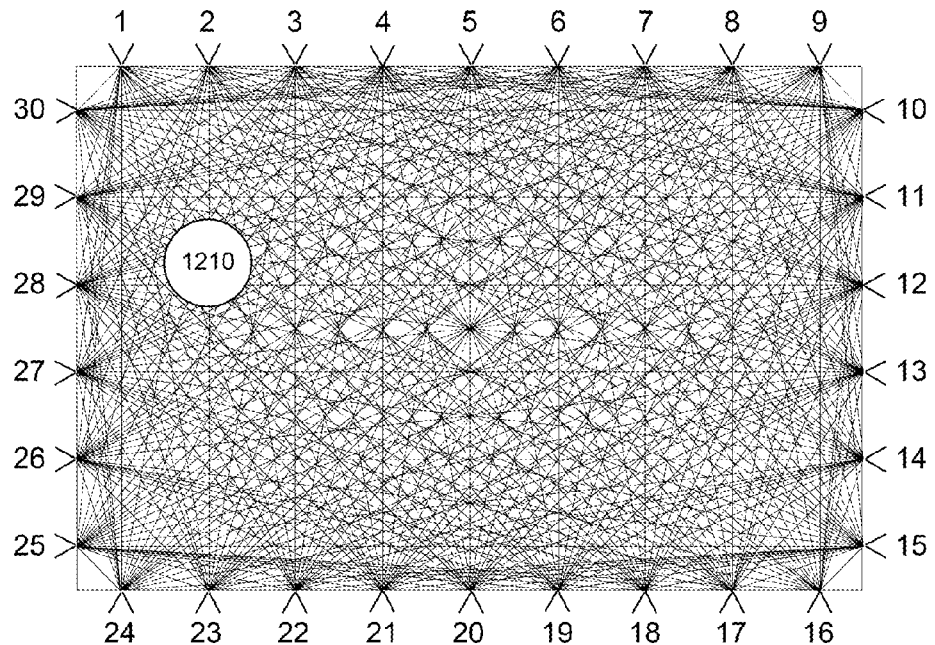
FIGS. 12A-12E are top views of beam paths illustrating templates for touch events.

FIG. 12A shows all of the possible pencil beam paths between any two of 30 beam terminals. In this example, beam terminals are not labeled as emitter or detector. Assume that there are sufficient emitters and detectors to realize any of the possible beam paths. One possible template for contact area 1210 is the set of all beam paths that would be affected by the touch. However, this is a large number of beam paths, so template matching will be more difficult. In addition, this template is very specific to contact area 1210. If the contact area changes slightly in size, shape or position, the template for contact area 1210 will no longer match exactly. Also, if additional touches are present elsewhere in the active area, the template will not match the detected data well. Thus, although using all possible beam paths can produce a fairly discriminating template, it can also be computationally intensive to implement.

Figure 12B:
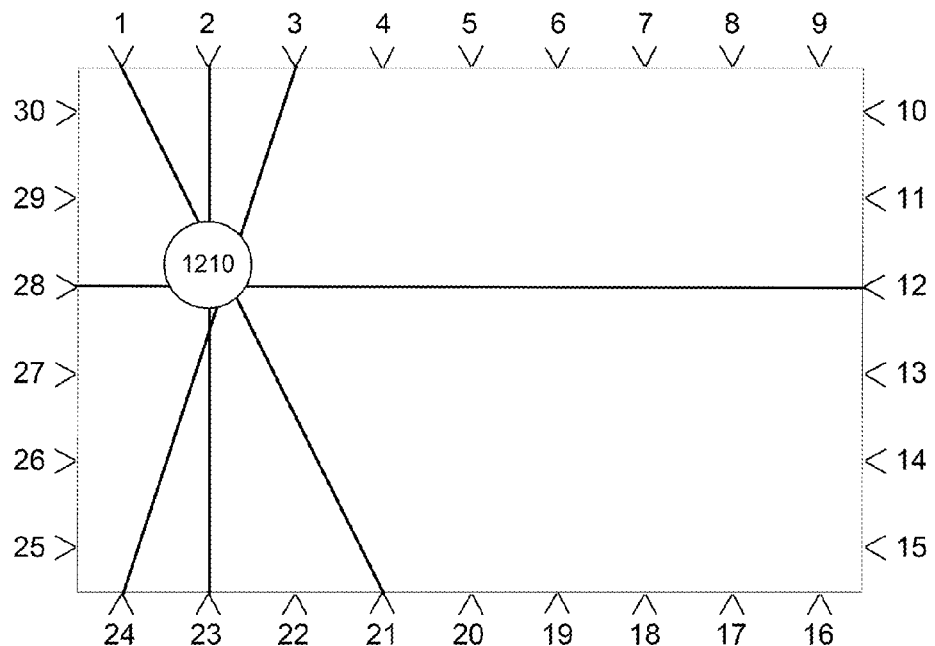

FIG. 12B shows a simpler template based on only four beams that would be interrupted by contact area 1210. This is a less specific template since other contact areas of slightly different shape, size or location will still match this template. This is good in the sense that fewer templates will be required to cover the space of possible contact areas. This template is less precise than the full template based on all interrupted beams. However, it is also faster to match due to the smaller size. These types of templates often are sparse relative to the full set of possible transmission coefficients.

Note that a series of templates could be defined for contact area 1210, increasing in the number of beams contained in the template: a 2-beam template, a 4-beam template, etc. In one embodiment, the beams that are interrupted by contact area 1210 are ordered sequentially from 1 to N. An n-beam template can then be constructed by selecting the first n beams in the order. Generally speaking, beams that are spatially or angularly diverse tend to yield better templates. That is, a template with three beams running at 60 degrees to each other and not intersecting at a common point tends to produce a more robust template than one based on three largely parallel beams which are in close proximity to each other. In addition, more beams tends to increase the effective signal-to-noise ratio of the template matching, particularly if the beams are from different emitters and detectors.

Figure 12C:
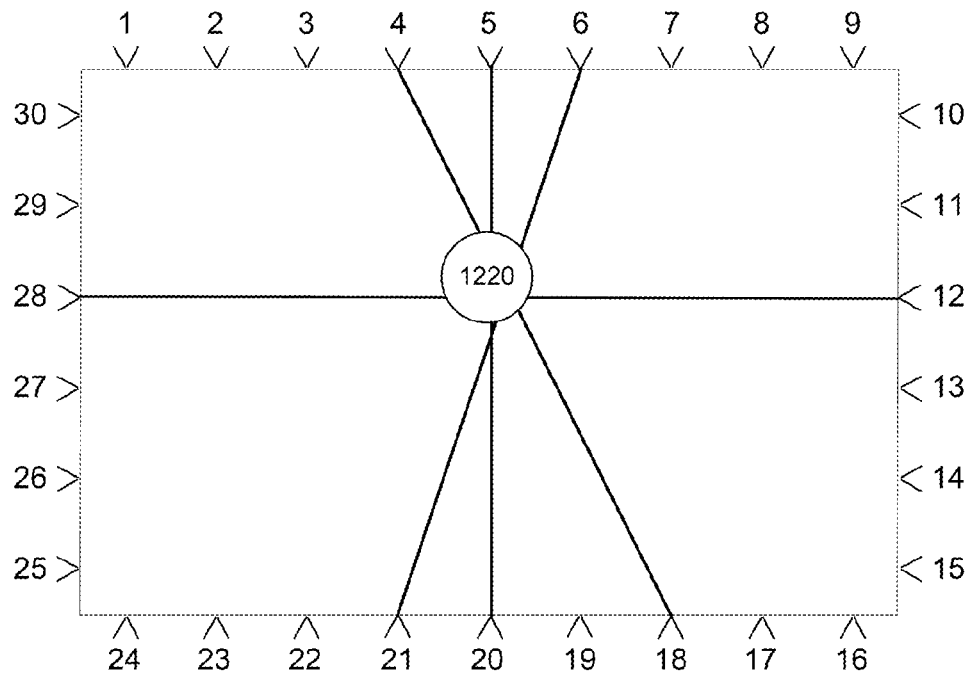

The template in FIG. 12B can also be used to generate a family of similar templates. In FIG. 12C, the contact area 1220 is the same as in FIG. 12B, but shifted to the right. The corresponding four-beam template can be generated by shifting beams (1,21) (2,23) and (3,24) in FIG. 12B to the right to beams (4,18) (5,20) and (6,21), as shown in FIG. 12C. These types of templates can be abstracted. The abstraction will be referred to as a template model. This particular model is defined by the beams (12,28) (i, 22−i) (i+1,24−i) (i+2,25−i) for i=1 to 6. In one approach, the model is used to generate the individual templates and the actual data is matched against each of the individual templates. In another approach, the data is matched against the template model. The matching process then includes determining whether there is a match against the template model and, if so, which value of i produces the match.

Figure 12D:
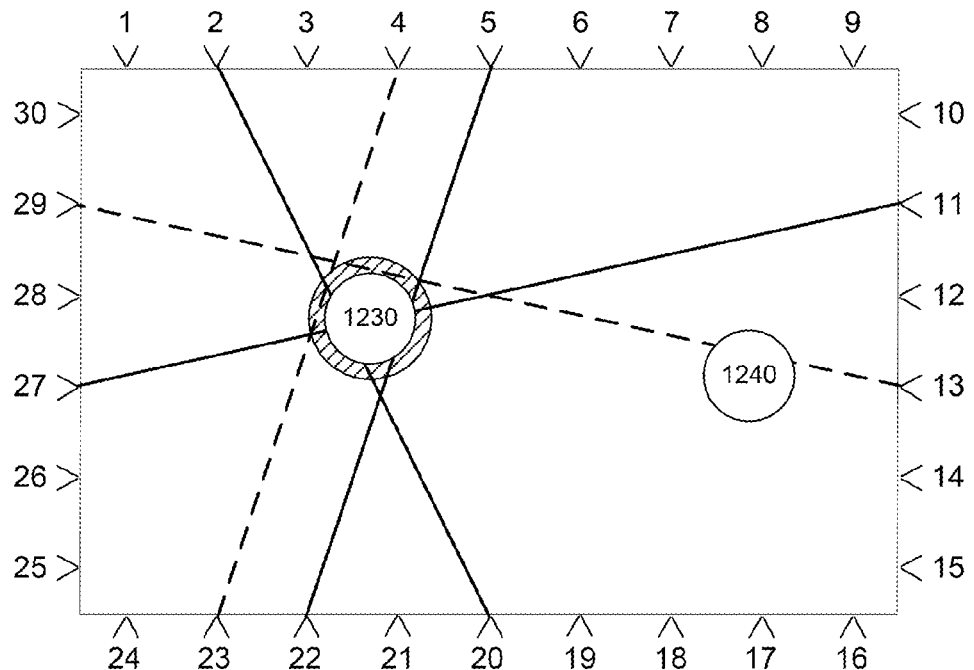

FIG. 12D shows a template that uses a "touch-free" zone around the contact area. The actual contact area is 1230. However, it is assumed that if contact is made in area 1230, then there will be no contact in the immediately surrounding shaded area. Thus, the template includes both (a) beams in the contact area 1230 that are interrupted, and (b) beams in the shaded area that are not interrupted. In FIG. 12D, the solid lines (2,20) (5,22) and (11,27) are interrupted beams in the template and the dashed lines (4,23) and (13,29) are uninterrupted beams in the template. Note that the uninterrupted beams in the template may be interrupted somewhere else by another touch point, so their use should take this into consideration. For example, dashed beam (13,29) could be interrupted by touch point 1240.

Figure 12E:
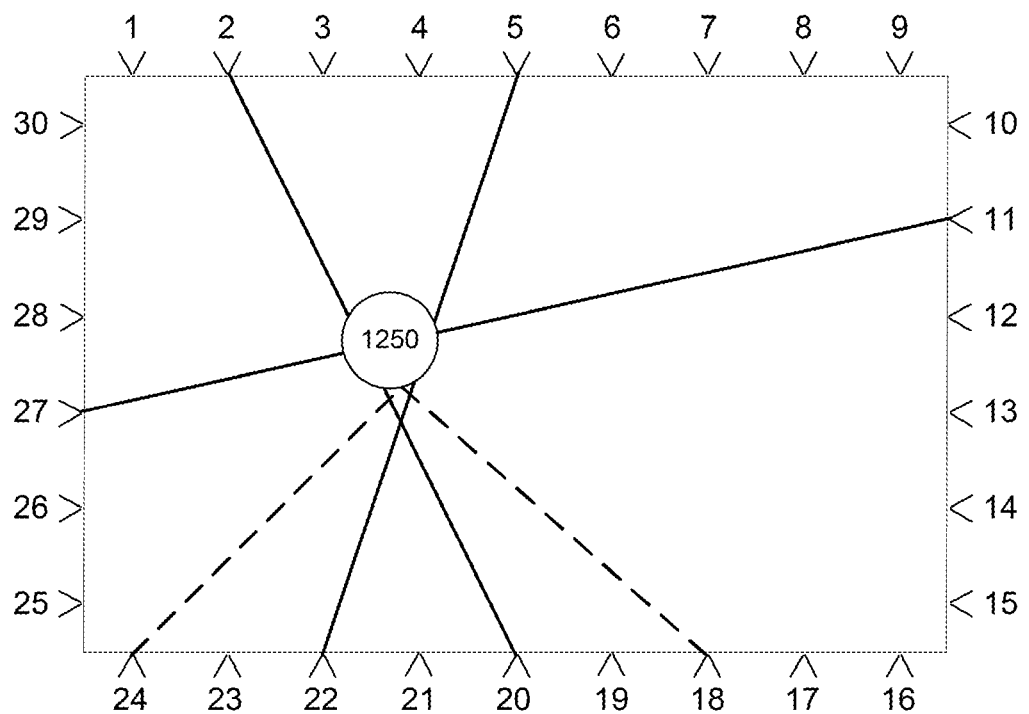

FIG. 12E shows an example template that is based both on reduced and enhanced transmission coefficients. The solid lines (2,20) (5,22) and (11,27) are interrupted beams in the template, meaning that their transmission coefficients should decrease. However, the dashed line (18,24) is a beam for which the transmission coefficient should increase due to reflection or scattering from the touch point 1250.

Other templates will be apparent and templates can be processed in a number of ways. In a straightforward approach, the disturbances for the beams in a template are simply summed or averaged. This can increase the overall SNR for such a measurement, because each beam adds additional signal while the noise from each beam is presumably independent. In another approach, the sum or other combination could be a weighted process, where not all beams in the template are given equal weight. For example, the beams which pass close to the center of the touch event being modeled could be weighted more heavily than those that are further away. Alternately, the angular diversity of beams in the template could also be expressed by weighting. Angular diverse beams are more heavily weighted than beams that are not as diverse.

In a case where there is a series of N beams, the analysis can begin with a relatively small number of beams. Additional beams can be added to the processing as needed until a certain confidence level (or SNR) is reached. The selection of which beams should be added next could proceed according to a predetermined schedule. Alternately, it could proceed depending on the processing results up to that time. For example, if beams with a certain orientation are giving low confidence results, more beams along that orientation may be added (at the expense of beams along other orientations) in order to increase the overall confidence.

The data records for templates can also include additional details about the template. This information may include, for example, location of the contact area, size and shape of the contact area and the type of touch event being modeled (e.g., finger, stylus, etc.).

In addition to intelligent design and selection of templates, symmetries can also be used to reduce the number of templates and/or computational load. Many applications use a rectangular active area with emitters and detectors placed symmetrically with respect to x and y axes. In that case, quadrant symmetry can be used to achieve a factor of four reduction. Templates created for one quadrant can be extended to the other three quadrants by taking advantage of the symmetry. Alternately, data for possible touch points in the other three quadrants can be transformed and then matched against templates from a single quadrant. If the active area is square, then there may be eight-fold symmetry.

Other types of redundancies, such as shift-invariance, can also reduce the number of templates and/or computational load. The template model of FIGS. 12B-C is one example.

In addition, the order of processing templates can also be used to reduce the computational load. There can be substantial similarities between the templates for touches which are nearby. They may have many beams in common, for example. This can be taken advantage of by advancing through the templates in an order that allows one to take advantage of the processing of the previous templates.

E. Multi-Pass Processing

Referring to FIG. 2, the processing phase need not be a single-pass process nor is it limited to a single technique. Multiple processing techniques may be combined or otherwise used together to determine the locations of touch events.

FIG. 13 is a flow diagram of a multi-pass processing phase based on several stages. This example uses the physical set-up shown in FIG. 9, where wide beams are transmitted from emitters to detectors. The transmission coefficients Tjk are analog values, ranging from 0 (fully blocked) to 1 (fully unblocked).

The first stage 1310 is a coarse pass that relies on a fast binary template matching, as described with respect to FIGS. 12B-D. In this stage, the templates are binary and the transmittances T'jk are also assumed to be binary. The binary transmittances T'jk can be generated from the analog values Tjk by rounding or thresholding 1312 the analog values. The binary values T'jk are matched 1314 against binary templates to produce a preliminary list of candidate touch points. Thresholding transmittance values may be problematic if some types of touches do not generate any beams over the threshold value. An alternative is to threshold the combination (by summation for example) of individual transmittance values.

Some simple clean-up 1316 is performed to refine this list. For example, it may be simple to eliminate redundant candidate touch points or to combine candidate touch points that are close or similar to each other. For example, the binary transmittances T'jk might match the template for a 5 mm diameter touch at location (x,y), a 7 mm diameter touch at (x,y) and a 9 mm diameter touch at (x,y). These may be consolidated into a single candidate touch point at location (x,y).

Stage 1320 is used to eliminate false positives, using a more refined approach. For each candidate touch point, neighboring beams may be used to validate or eliminate the candidate as an actual touch point. The techniques described in U.S. patent application Ser. No. 13/059,817 may be used for this purpose. This stage may also use the analog values Tjk, in addition to accounting for the actual width of the optical beams. The output of stage 1320 is a list of confirmed touch points.

The final stage 1330 refines the location of each touch point. For example, the interpolation techniques described previously can be used to determine the locations with better accuracy. Since the approximate location is already known, stage 1330 may work with a much smaller number of beams (i.e., those in the local vicinity) but might apply more intensive computations to that data. The end result is a determination of the touch locations.

Other techniques may also be used for multi-pass processing. For example, line images or touch event models may also be used. Alternatively, the same technique may be used more than once or in an iterative fashion. For example, low resolution templates may be used first to determine a set of candidate touch locations, and then higher resolution templates or touch event models may be used to more precisely determine the precise location and shape of the touch.

F. Beam Weighting

In processing the transmission coefficients, it is common to weight or to prioritize the transmission coefficients. Weighting effectively means that some beams are more important than others. Weightings may be determined during processing as needed, or they may be predetermined and retrieved from lookup tables or lists.

One factor for weighting beams is angular diversity. Usually, angularly diverse beams are given a higher weight than beams with comparatively less angular diversity. Given one beam, a second beam with small angular diversity (i.e., roughly parallel to the first beam) may be weighted lower because it provides relatively little additional information about the location of the touch event beyond what the first beam provides. Conversely, a second beam which has a high angular diversity relative to the first beam may be given a higher weight in determining where along the first beam the touch point occurs.

Another factor for weighting beams is position difference between the emitters and/or detectors of the beams (i.e., spatial diversity). Usually, greater spatial diversity is given a higher weight since it represents "more" information compared to what is already available.

Another possible factor for weighting beams is the density of beams. If there are many beams traversing a region of the active area, then each beam is just one of many and any individual beam is less important and may be weighted less. Conversely, if there are few beams traversing a region of the active area, then each of those beams is more significant in the information that it carries and may be weighted more.

In another aspect, the nominal beam transmittance (i.e., the transmittance in the absence of a touch event) could be used to weight beams. Beams with higher nominal transmittance can be considered to be more "trustworthy" than those which have lower nominal transmittance since those are more vulnerable to noise. A signal-to-noise ratio, if available, can be used in a similar fashion to weight beams. Beams with higher signal-to-noise ratio may be considered to be more "trustworthy" and given higher weight.

The weightings, however determined, can be used in the calculation of a figure of merit (confidence) of a given template associated with a possible touch location. Beam transmittance/signal-to-noise ratio can also be used in the interpolation process, being gathered into a single measurement of confidence associated with the interpolated line derived from a given touch shadow in a line image. Those interpolated lines which are derived from a shadow composed of "trustworthy" beams can be given greater weight in the determination of the final touch point location than those which are derived from dubious beam data.

These weightings can be used in a number of different ways. In one approach, whether a candidate touch point is an actual touch event is determined based on combining the transmission coefficients for the beams (or a subset of the beams) that would be disturbed by the candidate touch point. The transmission coefficients can be combined in different ways: summing, averaging, taking median/percentile values or taking the root mean square, for example. The weightings can be included as part of this process: taking a weighted average rather than an unweighted average, for example. Combining multiple beams that overlap with a common contact area can result in a higher signal to noise ratio and/or a greater confidence decision. The combining can also be performed incrementally or iteratively, increasing the number of beams combined as necessary to achieve higher SNR, higher confidence decision and/or to otherwise reduce ambiguities in the determination of touch events.

IV. Applications

The touch-sensitive devices described above can be used in various applications. Touch-sensitive displays are one class of application. This includes displays for tablets, laptops, desktops, gaming consoles, smart phones and other types of compute devices. It also includes displays for TVs, digital signage, public information, whiteboards, e-readers and other types of good resolution displays. However, they can also be used on smaller or lower resolution displays: simpler cell phones, user controls (photocopier controls, printer controls, control of appliances, etc.). These touch-sensitive devices can also be used in applications other than displays. The "surface" over which the touches are detected could be a passive element, such as a printed image or simply some hard surface. This application could be used as a user interface, similar to a trackball or mouse.

V. Additional Considerations

The figures depict embodiments of the present invention for purposes of illustration only. One skilled in the art will readily recognize from the following discussion that alternative embodiments of the structures and methods illustrated herein may be employed without departing from the principles of the invention described herein.

Upon reading this disclosure, those of skill in the art will appreciate still additional alternative structural and functional designs through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for determining simultaneous touch events on a surface, the surface having emitters and detectors arranged around its periphery, the emitters producing optical beams received by the detectors, the touch events disturbing the optical beam, the method comprising:

receiving information indicating which beams have been disturbed by touch events;

based on the received information, determining line images of the touch events from the viewpoints of the emitters and/or detectors, wherein a line image, for a given one of the detectors or emitters, is a one-dimensional image representing an analog quantity of transmittance of an optical beam between the given detector or emitter and complementary emitters or detectors optically coupled to the given detector or emitter; and determining the touch events based on the line images.

2. The method of claim 1 wherein the line images of the touch events are from the viewpoints of only detectors.

3. The method of claim 1 wherein the line images of the touch events are from the viewpoints of only emitters.

4. The method of claim 1 wherein a line image is produced by combining beam patterns from two or more emitters and/or detectors.

5. The method of claim 4 wherein the emitters and detectors are interleaved around the periphery of the surface, and the line image is produced by combining beam patterns from an emitter and an adjacent detector.

6. The method of claim 1 wherein beams from emitters to detectors are wide enough to be partially disturbed by a touch event, and the analog line images are based on such partial disturbance.

7. The method of claim 1 wherein each line image spans at least a 5 degree field of view.

8. The method of claim 1 wherein each line image spans at least a 10 degree field of view.

9. The method of claim 1 wherein each line image spans at least a 20 degree field of view.

10. The method of claim 1 wherein at least one line image spans at least a 45 degree field of view.

11. The method of claim 1 wherein at least one line image spans at least a 60 degree field of view.

12. The method of claim 1 wherein at least one line image spans at least a 90 degree field of view.

13. The method of claim 1 wherein at least one line image spans at least a 120 degree field of view.

14. The method of claim 1 wherein the surface is rectangular, and at least one line image spans at least one half of one side of the rectangle.

15. The method of claim 1 wherein the surface is rectangular, and at least one line image spans at least one side of the rectangle.

16. The method of claim 1 wherein the surface is rectangular, and at least one line image spans at least half the perimeter of the rectangle.

17. The method of claim 1 wherein at least 4 line images are determined.

18. The method of claim 1 wherein at least 8 line images are determined.

19. The method of claim 1 wherein at least 4 line images are determined per touch event.

20. The method of claim 1 wherein N emitters and detectors are arranged around the periphery of the surface and at least N/2 line images are determined.

21. The method of claim 1 wherein the surface has a periphery of length L in inches and at least 2L line images are determined.

22. The method of claim 1 wherein the received information is a set of transmission coefficients indicative that a transmission of a beam between an emitter and a detector has been disturbed, and the line images are determined from the transmission coefficients.

23. The method of claim 1 wherein the beams include rectangular beams.

24. The method of claim 1 wherein the beams include fan-shaped beams.

25. The method of claim 1 wherein the beams include trapezoidal beams.

26. The method of claim 1 wherein the beams include pencil beams.

27. The method of claim 1 wherein the step of determining the touch events based on the line images comprises:

for the line images:
locating images of touch events in the line images; and
determining candidate lines for the touch events based on a location of the viewpoint for the line image and a location of the image of the touch event; and determining the touch events based on the candidate lines.

28. The method of claim 1 wherein within a line image, a location of the image of a touch event is determined based on analog values of the image of the touch event.

29. The method of claim 1 wherein the analog quantity of transmittance of the optical beam between the given detector or emitter and complementary emitters or detectors corresponds to an amount of light exchanged during the touch events compared to an amount of light that the given detector or emitter would have received from or transmitted to the complementary emitters or detectors in the absence of any touch event interacting with the optical beam.

30. An optical touch-sensitive device comprising:
a surface for which touch events are to be detected;
emitters and detectors arranged around a periphery of the surface, the emitters producing optical beams received by the detectors, the touch events disturbing the optical beam; and
a touch event processor coupled, directly or indirectly, to the emitters and detectors, the touch event processor receiving information indicating which beams have been disturbed by touch events; based on the received information, determining line images of the touch events from the viewpoints of the emitters and/or detectors; and determining the touch events based on the line images, a line image, for a given one of the detectors or emitters, is a one-dimensional image representing an analog quantity of transmittance of an optical beam between the given detector or emitter and complementary emitters or detectors optically coupled to the given detector or emitter.

31. The optical touch-sensitive device of claim 30 wherein the analog quantity of transmittance of the optical beam between the given detector or emitter and complementary emitters or detectors corresponds to an amount of light exchanged during the touch events compared to an amount of light that the given detector or emitter would have received from or transmitted to the complementary emitters or detectors in the absence of any touch event interacting with the optical beam.

* * * * *